(12) United States Patent
Houda et al.

(10) Patent No.: US 7,969,793 B2
(45) Date of Patent: *Jun. 28, 2011

(54) REGISTER CONFIGURATION CONTROL DEVICE, REGISTER CONFIGURATION CONTROL METHOD, AND PROGRAM FOR IMPLEMENTING THE METHOD

(75) Inventors: Saori Houda, Kawasaki (JP); Hideyuki Rengakuji, Koto-ku (JP)

(73) Assignee: Canon Kabushiki Kaisha (JP)

( * ) Notice: Subject to any disclaimer, the term of this patent is extended or adjusted under 35 U.S.C. 154(b) by 101 days.

This patent is subject to a terminal disclaimer.

(21) Appl. No.: 12/389,862

(22) Filed: Feb. 20, 2009

(65) Prior Publication Data

US 2009/0160973 A1 Jun. 25, 2009

Related U.S. Application Data

(63) Continuation of application No. 11/429,033, filed on May 5, 2006, now Pat. No. 7,512,021.

(30) Foreign Application Priority Data

May 6, 2005 (JP) ................................. 2005-135350
Apr. 21, 2006 (JP) ................................. 2006-117655

(51) Int. Cl.
*G11C 7/10* (2006.01)
(52) U.S. Cl. ......... 365/189.05; 365/189.08; 365/189.17; 365/191; 348/231.99
(58) Field of Classification Search ............. 365/189.17, 365/191, 198, 233.1, 185.05, 189.08; 348/222.1, 348/223.1, 240.99, 231.99
See application file for complete search history.

(56) References Cited

U.S. PATENT DOCUMENTS

| 5,847,700 | A | 12/1998 | Hannah |
| 6,806,872 | B2 | 10/2004 | Mino et al. |
| 7,274,371 | B2 | 9/2007 | Cheng et al. |
| 7,512,021 | B2 * | 3/2009 | Houda et al. ............. 365/189.12 |

FOREIGN PATENT DOCUMENTS

JP 2002-304167 A 10/2002

* cited by examiner

*Primary Examiner* — Alexander Sofocleous
(74) *Attorney, Agent, or Firm* — Rossi, Kimms & McDowell LLP

(57) ABSTRACT

A resister configuration control device which is capable of updating resister configuration values during a non-display period without increasing a circuit scale. A FIFO selector 103 receives register configuration value information comprising a register configuration value and address information, and selects a transmission destination to which the register configuration value information is to be sent, from FIFOs 108 and 109 based on the address information and sends the register configuration value information to the selected destination. The FIFO 108 or 109 temporarily stores the register configuration value information sent from the FIFO selector 103, and reads-out and outputs the register configuration value information in predetermined timing. A data selector 110 selects one of the register configuration value information sent from the FIFO selector 103 and the register configuration value information output from the FIFO 108 or 109, according to a predetermined priority, and outputs the selected register configuration value information.

4 Claims, 22 Drawing Sheets

FIG.2A addr

FIG.2B addr'

FIG.2C addr"

FIG.8

| ADDRESS OF MEMORY SPACE | | | USE OF MEMORY SPACE | TRANSMITTING END | REGISTER TO BE CONFIGURED |
|---|---|---|---|---|---|
| bit9–8 | bit7–4 | bit3–0 | | | |
| 11 | | | | | |
| 10 | 0010 | xxxx | FIFO(b) | FIFO(b) | REGISTER GROUP OF CIRCUIT C |
| | 0001 | xxxx | | | REGISTER GROUP OF CIRCUIT B |
| | 0000 | xxxx | | | REGISTER GROUP OF CIRCUIT A |
| 01 | 0010 | xxxx | FIFO(a) | FIFO(a) | REGISTER GROUP OF CIRCUIT C |
| | 0001 | xxxx | | | REGISTER GROUP OF CIRCUIT B |
| | 0000 | xxxx | | | REGISTER GROUP OF CIRCUIT A |
| 00 | 0010 | xxxx | REGISTER GROUP OF CIRCUIT C | CPU | REGISTER GROUP OF CIRCUIT C |
| | 0001 | xxxx | REGISTER GROUP OF CIRCUIT B | | REGISTER GROUP OF CIRCUIT B |
| | 0000 | xxxx | REGISTER GROUP OF CIRCUIT A | | REGISTER GROUP OF CIRCUIT A |

FIG.9

| ADDRESS OF MEMORY SPACE | | USE OF MEMORY SPACE | TRANSMITTING END | REGISTER TO BE CONFIGURED |
|---|---|---|---|---|
| bit7-4 | bit3-0 | | | |
| 0100 | xxx1 | FIFO(b) | ADDRESS DECODER | ADDRESS OF DATA2' IN FIFO(b) |
| 0100 | xxx0 | FIFO(b) | ADDRESS DECODER | ADDRESS OF DATA2" IN FIFO(b) |
| 0011 | xxx1 | FIFO(a) | ADDRESS DECODER | ADDRESS OF DATA2' IN FIFO(a) |
| 0011 | xxx0 | FIFO(a) | ADDRESS DECODER | ADDRESS OF DATA2" IN FIFO(a) |
| 0010 | xxxx | REGISTER GROUP OF CIRCUIT C | CPU | REGISTER GROUP OF CIRCUIT C |
| 0001 | xxxx | REGISTER GROUP OF CIRCUIT B | CPU | REGISTER GROUP OF CIRCUIT B |
| 0000 | xxxx | REGISTER GROUP OF CIRCUIT A | CPU | REGISTER GROUP OF CIRCUIT A |

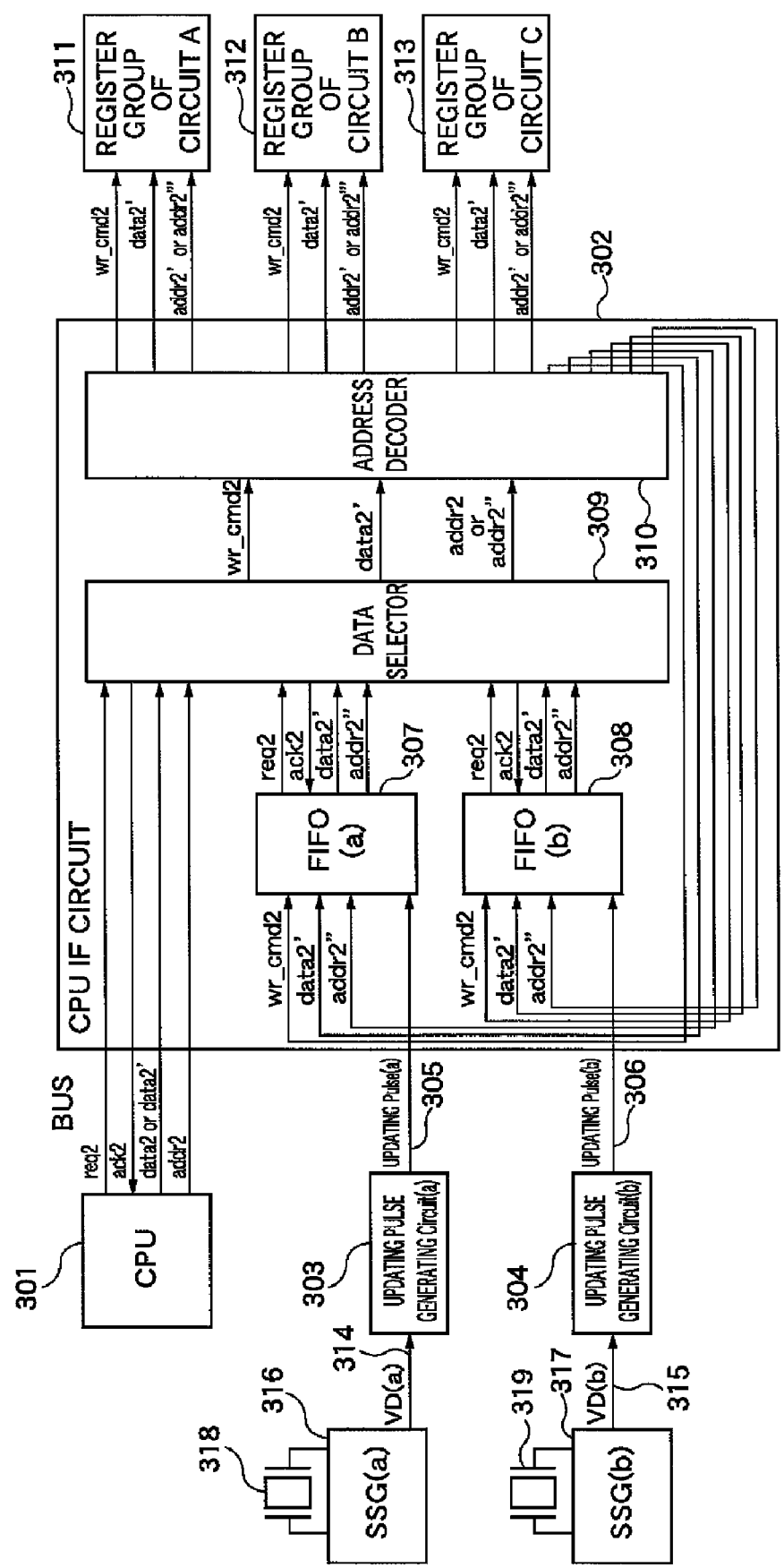

REGISTER CONFIGURATION CONTROL DEVICE, REGISTER CONFIGURATION CONTROL METHOD, AND PROGRAM FOR IMPLEMENTING THE METHOD

This is a continuation of U.S. patent application Ser. No. 11/429,033 filed May 5, 2006.

BACKGROUND OF THE INVENTION

1. Field of the Invention

The present invention relates to a register configuration control device for performing register configuration for peripheral circuits from a host CPU, a register configuration control method applied to the register configuration control device, and a program for causing a computer to execute the register configuration control method.

2. Description of the Related Art

Conventionally, there has been proposed a display processing device whose display output section for digitally processing video signals for display is controlled by a host CPU.

FIG. 16 is a block diagram of the conventional display processing device.

Referring to FIG. 16, the display output section is comprised of a CPU interface (CPU IF) circuit 202 and a plurality of register groups 203 to 205, and a host CPU 201 is connected to the display output section. The register groups 203 to 205 are storage devices for storing various kinds of display configuration data for use in a plurality of circuits A, B, and C, not shown.

The operation of the host CPU 201 for updating the display configuration data stored in the register groups 203 to 205 is required to be performed during a non-display period during which an image based on a video signal is not displayed on an image display device, not shown. The non-display period can be determined based on a vertical synchronization signal.

If the host CPU 201 performs updating of the display configuration data for the register groups 203 to 205 during a display period, since the CPU IF circuit 202 has to carry out display processing based on the updated data immediately after the updating process, the quality of an image displayed on the image display device is degraded, or flickering of the image occurs. To avoid such a problem, updating of the display configuration data stored in the register groups 203 to 205 is required to be performed during the non-display period.

FIG. 17 is a timing diagram illustrating transmission of register configuration value information to the register groups 203 to 205 from the CPU 201 and writing (updating) of the same into the register groups 203 to 205 by the host CPU 201.

The register configuration value information is comprised of address data of a register and configuration data to be written in the register. The register configuration value information is output from the host CPU 201 via an address bus (B) and a data bus (C), and when a write signal/WR (D) goes low, the configuration data is written into predetermined locations of the register designated by the address data. It takes several clock cycles (A) from output of configuration data from the host CPU 201 to completion of writing the same into the register.

The non-display period (V blanking period) is a part of one cycle of the vertical synchronization signal, and the CPU IF circuit 202 accesses the register groups 203 to 205 during the non-display period, as described above. However, if the non-display period is short, there is a fear that the CPU IF circuit 202 cannot complete writing of configuration data into the register groups 203 to 205.

To eliminate this fear, a method can be envisaged in which a cycle of the vertical synchronization signal is prolonged so as to prolong its non-display period to thereby secure a time period for updating of register settings. However, this method causes reduction of a frame rate of an image. To solve the problem, there has conventionally been proposed a display processing device described below (see e.g. Japanese Laid-Open Patent Publication (Kokai) No. 2002-304167).

This display processing device is provided with first and second display configuration register groups. Configuration data and address data are temporarily stored in the first display configuration register group, and then they are finally stored in the second display configuration register group. More specifically, configuration data and address data are sent to the first display configuration register group from a host CPU. A write access to the first display configuration register group is performed asynchronously with respect to a vertical synchronization signal. Next, the second display configuration register group reads out the data stored in the first display configuration register group simultaneously in synchronism with the vertical synchronization signal, and writes the configuration data into register positions designated by the address data. When configuration data already exists, the configuration data is overwritten and updated.

However, if the above described conventional display processing device has a plurality of circuits, other than the image display device, which require updating of register configuration during the non-display period, it is necessary to provide two stages of registers (first and second display configuration register groups), for all registers which can require updating of register configuration values. This brings about the problem of an increased circuit scale of the display processing device.

SUMMARY OF THE INVENTION

It is an object of the present invention to provide a resister configuration control device, and a resister configuration control method, which make it possible to update resister configuration values during a non-display period without increasing a circuit scale, and a program for implementing the method.

To attain the above object, in a first aspect of the present invention, there is provided a register configuration control device comprising a first selection section that receives register configuration value information comprising a register configuration value and address information, selects a transmission destination to which the register configuration value information is to be sent, from a plurality of first transmission destinations based on the address information, and sends the register configuration value information to the selected destination, at least one temporary storage section that temporarily stores the register configuration value information sent from the first selection section, and reads out and outputs the register configuration value information in predetermined timing, the temporary storage section being one of the first transmission destinations, and a second selection section that selects one of the register configuration value information sent from the first selection section and the register configuration value information output from the temporary storage section, according to a predetermined priority, and outputs the selected register configuration value information, the second selection section being another of the first transmission destinations.

With this configuration of the first aspect of the present invention, at least one temporary storage section that temporarily stores register configuration information is provided, and register configuration information sent during a display period is temporarily stored in the temporary storage section by referring to the bit information of address information. Then, during a non-display period following the display period, register configurations are sequentially performed according to a predetermined priority, using register configuration information sent directly from a host CPU and the register configuration information temporarily stored in the temporary storage section.

As a consequence, it is no longer necessary to provide registers configured in two stages, and an increase in the circuit scale can be prevented. Further, it is possible to perform simultaneous configuration (updating) of registers at high speed in designated timing during a non-display period (blanking period).

Furthermore, by using adjacent areas in a memory space for temporary storage, it is possible to concentrate memory areas for use in register configuration, thereby reducing the memory space for use in temporary storage.

Preferably, the register configuration control device performs register configuration for a register group including a control register for controlling at least one of an image display device and an image pickup apparatus, and the predetermined timing is included in at least one of a non-display period during which an image scanning line is not positioned on an effective display screen of the image display device and a blanking period during which no effective video signal is output from an image pickup element of the image pickup apparatus.

Preferably, the register configuration control device performs register configuration for a register group including a control register for controlling at least one of an image display device and an image pickup apparatus, the register configuration control device further comprising a third selection section that selects a transmission destination to which the register configuration value information output from the second selection section is to be sent, from at least one second transmission destination based on address information contained in the register configuration value information output from the second selection section, and sends the register configuration value information to the selected destination, and a writing section that writes a register configuration value contained in the register configuration value information sent from the third selection section into a register included in the at least one second transmission destination and indicated by address information contained in the register configuration value information sent from the third selection section.

More preferably, the address information comprises first bit information, second bit information, and third bit information, and the first selection section refers to the first bit information, the third selection section refers to the second bit information, and the writing section writes the register configuration value in a register indicated by the third bit information.

Preferably, the register configuration control device performs register configuration for a register group including a control register for controlling an image display device and an image pickup apparatus, and the at least one temporary storage section includes first and second temporary storage devices, the register configuration control device further comprising a first notification section that notifies the first temporary storage device of first predetermined timing included in the blanking period during which no effective video signal is output from an image pickup element of the image pickup apparatus, and a second notification section that notifies the second temporary storage device of second predetermined timing included in the non-display period during which an image scanning line is not positioned on an effective display screen of the image display device.

Preferably, the register configuration control device performs register configuration for a register group including a control register for controlling at least one of an image display device and an image pickup apparatus, wherein timing in which register configuration value information is sent from the first selection section to the second selection section is included in a non-display period during which an image scanning line is not positioned on an effective display screen in a case where register configuration is to be performed for the register group of the image display device, and is included in a blanking period during which no effective video signal is output from the image pickup element in a case where register configuration is to be performed for the register group of the image pickup apparatus, and wherein register configuration is performed whenever required in a case where the register configuration is to be performed for a register other than the image display device or the image pickup apparatus.

To attain the above object, in a second aspect of the present invention, there is provided a register configuration control device comprising a central processing unit that transmits first register configuration value information comprising a first register configuration value indicative of a value to be written into a register and first address information indicative of a register address, or second register configuration value information comprising a second register configuration value and second address information indicative of an address of at least one temporary storage section, the second register configuration value comprising a third register configuration value indicative of a value to be written into a register and third address information indicative of a register address, via a data bus and an address bus, a first selection section that receives the first register configuration value information or the second register configuration value information from the central processing unit, and the third register configuration value information from the at least one temporary storage section, and selects one transmission destination according to a predetermined priority to output corresponding register configuration value information, a second selection section that is operable when the first register configuration value information or the third register configuration value information is output from the first selection section, to select a transmission destination to which the first register configuration value information is to be sent, from at least one first transmission destination based on address information contained in the register configuration value information output from the first selection section, and send the first register configuration value information to the selected transmission destination, or when the second register configuration value information is output from the first selection section, to select a transmission destination to which the second register configuration value information is to be sent, from at least one second transmission destination based on the second address information, and send the second register configuration value information to the selected transmission destination, and at least one temporary storage section that is included in each of the at least one second transmission destination, the at least one temporary storage section temporarily storing the third register configuration value and the third address information contained in the second register configuration value sent from the second selection section as the third register configuration value information, and reading out and outputting the third register configuration value information in predetermined timing.

Preferably, the register configuration control device further comprises a writing section that writes the first register configuration value or the third register configuration value into a register included in the at least one first transmission destination and indicated by address information contained in the first register configuration value information or the third register configuration value information sent from the second selection section.

Preferably, the register configuration control device performs register configuration for a register group including a control register for controlling at least one of an image display device and an image pickup apparatus, and the predetermined timing is included in at least one of a non-display period during which an image scanning line is not positioned on an effective display screen of the image display device and a blanking period during which no effective video signal is output from an image pickup element of the image pickup apparatus.

Preferably, the register configuration control device performs register configuration for a register group including a control register for controlling an image display device and an image pickup apparatus, and the at least one temporary storage section includes first and second temporary storage devices, the register configuration control device further comprising a first notification section that notifies the first temporary storage device of first predetermined timing included in a blanking period during which no effective video signal is output from an image pickup element of the image pickup apparatus, and a second notification section that notifies the second temporary storage device of second predetermined timing included in a non-display period during which an image scanning line is not positioned on an effective display screen of the image display device.

Preferably, the register configuration control device is incorporated in an image pickup apparatus comprising a color interpolation circuit that interpolates digital image data into pixel-by-pixel red, green, and blue color signals, a white balance correction circuit that corrects white balance of the red, green, and blue color signals, a 3D lookup table conversion circuit that performs color tone conversion of the red, green, and blue color signals having undergone the white balance correction, a gamma table conversion circuit that performs gamma correction on the color tone-converted red, green, and blue color signals, a color space conversion circuit that performs color space conversion for converting the red, green, and blue color signals having undergone the gamma correction into luminance and color difference signals, and a zoom circuit that performs reduction and magnification of an image corresponding to the luminance and color difference signals, wherein the color interpolation circuit, the white balance correction circuit, the 3D lookup table conversion circuit, the gamma table conversion circuit, and the zoom circuit are provided with respective registers, and wherein the register configuration control device performs register configuration for these registers.

More preferably, the predetermined timing is included in a blanking period during which no effective video signal is output from an image pickup element of the image pickup apparatus.

Further preferably, the white balance correction circuit has a buffer provided upstream of the register.

To attain the above object, in a third aspect of the present invention, there is provided a register configuration control method comprising a first selection step of receiving register configuration value information comprising a register configuration value and address information, selecting a transmission destination to which the register configuration value information is to be sent, from a plurality of first transmission destinations based on the address information, and sending the register configuration value information to the selected destination, a temporary storage step of temporarily storing the register configuration value information sent in the first selection step into a storage device, and reading out and outputting the register configuration value information therefrom in predetermined timing, and a second selection step of selecting one of the register configuration value information sent in the first selection step and the register configuration value information output in the temporary storage step, according to a predetermined priority, and outputting the selected register configuration value information.

To attain the above object, in a fourth aspect of the present invention, there is provided a register configuration control method comprising an output step of outputting, from a central processing unit, first register configuration value information comprising a first register configuration value indicative of a value to be written into a register and first address information indicative of a register address, or second register configuration value information comprising a second register configuration value and second address information indicative of an address of at least one temporary storage section, the second register configuration value comprising a third register configuration value indicative of a value to be written into a register and third address information indicative of a register address, to a data bus and an address bus, a first selection step of receiving the first register configuration value information or the second register configuration value information from the central processing unit, and the third register configuration value information from the at least one temporary storage section, and selecting one transmission destination according to a predetermined priority to output corresponding register configuration value information, a second selection step of selecting, when the first register configuration value information or the third register configuration value information is output in the first selection step, a transmission destination to which the first register configuration value information is to be sent, from at least one first transmission destination based on address information, and sending the first register configuration value information to the selected transmission destination, or selecting, when the second register configuration value information is output in the first selection step, a transmission destination to which the second register configuration value information is to be sent, from at least one second transmission destination based on the second address information, and sending the second register configuration value information to the selected transmission destination, and a temporary storage step of temporarily storing the third register configuration value and the third address information contained in the second register configuration value sent in the second selection step, into the temporary storage section, as the third register configuration value information, and reading out and outputting the third register configuration value information therefrom in predetermined timing, for use in the selection in the first selection step.

To attain the above object, in a fifth aspect of the present invention, there is provided a program for causing a computer to execute a register configuration control method, the register configuration control method comprising a first selection step of receiving register configuration value information comprising a register configuration value and address information, selecting a transmission destination to which the register configuration value information is to be sent, from a plurality of first transmission destinations based on the address information, and sending the register configuration value information to the selected destination, a temporary storage step of temporarily storing the register configuration value information sent in the first selection step into a storage device, and reading out and outputting the register configuration value information therefrom in predetermined timing, and a second selection step of selecting one of the register configuration value information sent in the first selection step and the register configuration value information output in the temporary storage step, according to a predetermined priority, and outputting the selected register configuration value information.

To attain the above object, in a sixth aspect of the present invention, there is provided a program for causing a computer to execute a register configuration control method, the register configuration control method comprising an output step of outputting, from a central processing unit, first register configuration value information comprising a first register configuration value indicative of a value to be written into a register and first address information indicative of a register address, or second register configuration value information comprising a second register configuration value and second address information indicative of an address of at least one temporary storage section, the second register configuration value comprising a third register configuration value indicative of a value to be written into a register and third address information indicative of a register address, to a data bus and an address bus, a first selection step of receiving the first register configuration value information or the second register configuration value information from the central processing unit, and the third register configuration value information from the at least one temporary storage section, and selecting one transmission destination according to a predetermined priority to output corresponding register configuration value information, a second selection step of selecting, when the first register configuration value information or the third register configuration value information is output in the first selection step, a transmission destination to which the first register configuration value information is to be sent, from at least one first transmission destination based on address information, and sending the first register configuration value information to the selected transmission destination, or selecting, when the second register configuration value information is output in the first selection step, a transmission destination to which the second register configuration value information is to be sent, from at least one second transmission destination based on the second address information, and sending the second register configuration value information to the selected transmission destination, and a temporary storage step of temporarily storing the third register configuration value and the third address information contained in the second register configuration value sent in the second selection step, in the temporary storage section, as the third register configuration value information, and reading out and outputting the third register configuration value information therefrom in predetermined timing, for use in the selection in the first selection step.

The above and other objects, features, and advantages of the invention will become more apparent from the following detailed description taken in conjunction with the accompanying drawings.

BRIEF DESCRIPTION OF THE DRAWINGS

FIG. 8 is a diagram of a memory map;

FIG. 9 is a diagram of a memory map in a second embodiment of the present invention;

FIG. 10 is a block diagram of a register configuration control device according to the second embodiment;

DETAILED DESCRIPTION OF THE PREFERRED EMBODIMENTS

Figure 1:
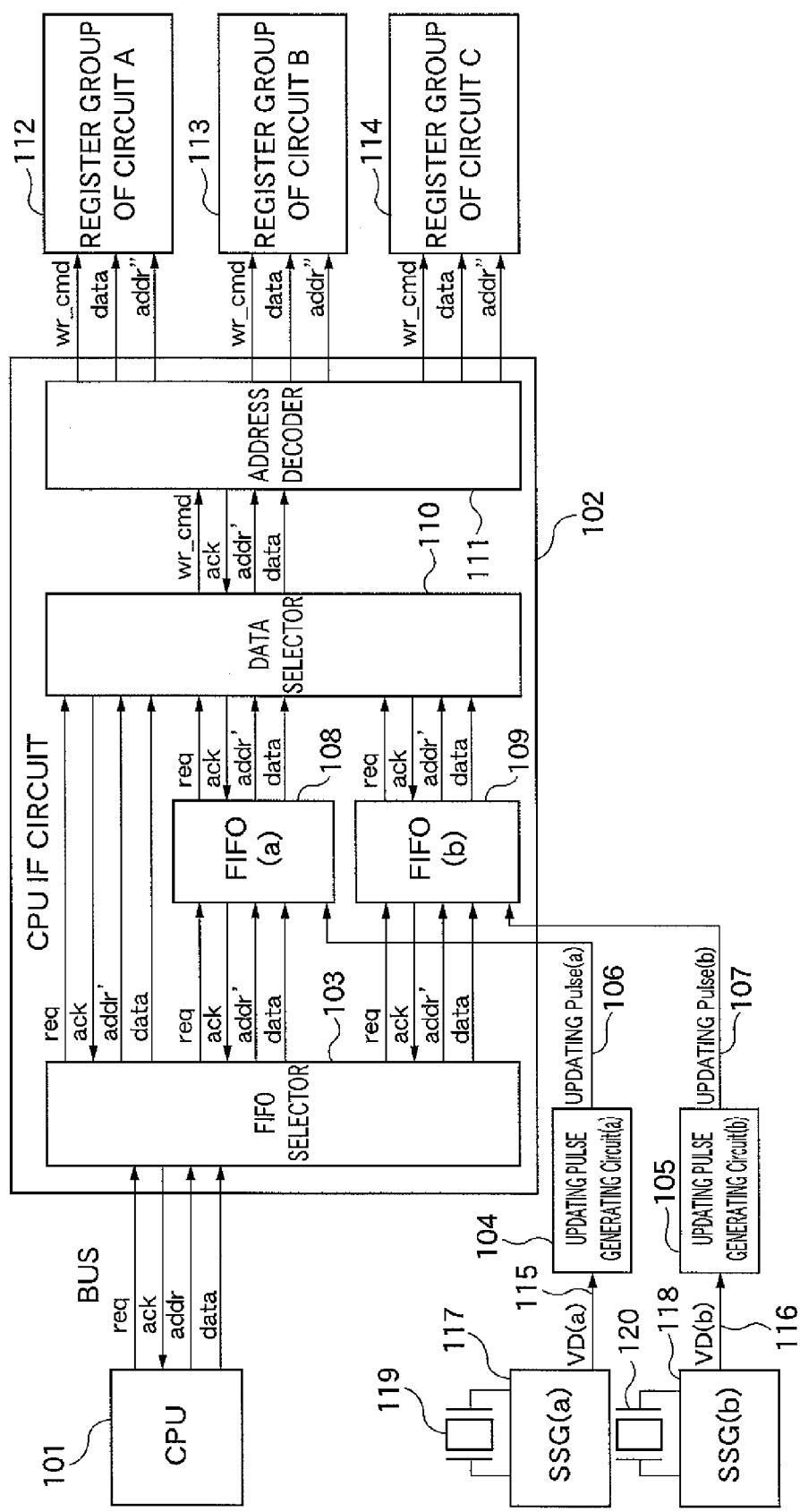
FIG. 1 is a block diagram of a register configuration control device according to a first embodiment of the present invention.

The present invention will now be described in detail with reference to the drawings showing preferred embodiments thereof. In the drawings, elements and parts which are identical throughout the views are designated by identical reference numeral, and duplicate description thereof is omitted.

First, a description will be given of a first embodiment of the present invention with reference to the drawing.

FIG. 1 is a block diagram of a register configuration control device according to the first embodiment. The register configuration control device performs register configurations for register groups including control registers for controlling an image pickup device and an image display device.

Referring to FIG. 1, a CPU 101 delivers a request signal (hereinafter referred to as "the signal req"), an acknowledge signal (hereinafter referred to as "the signal ack"), a 10-bit address signal (hereinafter referred to as "the signal addr"), and a 32-bit data signal (hereinafter referred to as "the 32-bit signal data") to a CPU interface (IF) circuit 102. These signals are for use in writing register configuration values in a register group 112 of a circuit A, a register group 113 of a circuit B, and a register group 114 of a circuit C, which are included in a control device for controlling the image pickup device and the image display device.

The signal req requests writing of a register configuration value. The signal ack notifies a signal req-transmitting end of completion of writing of the register configuration value. The signal addr indicates an address of a register in which the register configuration value is to be written. The signal data indicates the register configuration value to be written in the register.

Figure 2:
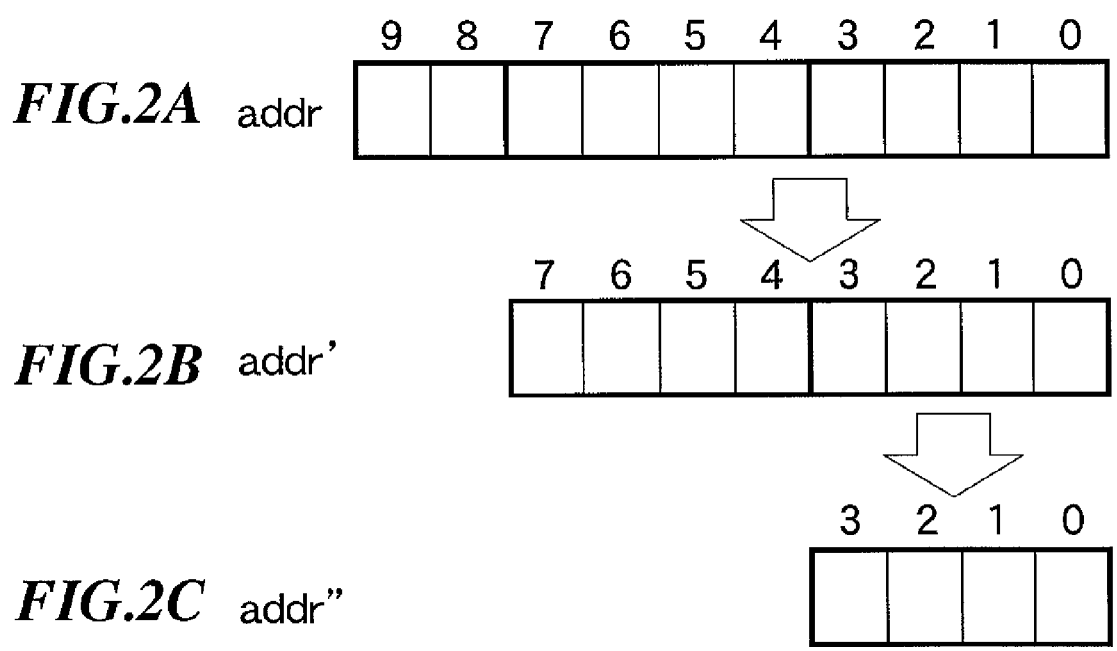
FIGS. 2A to 2C are diagrams useful in explaining bit allocation of a signal addr.

FIGS. 2A to 2C are diagrams illustrating bit allocation of the signal addr. In the following, the register configuration control device shown in FIG. 1 will be described with reference to FIGS. 2A to 2C.

The signal addr which is sent from the CPU 101 to the CPU IF 102 is formed of 10 bits (see FIG. 2A). In the CPU IF 102, when a FIFO selector 103 refers to the bits 9-8 of the signal addr, if the bits are set to "00", the less significant 8 bits of the signal addr are sent as a signal addr' (see FIG. 2B) to a data selector 110. Similarly, if the bits 9-8 of the signal addr are set to "01", the signal addr' is sent to a FIFO (a) 108, while if the bits 9-8 are set to "10", the signal addr' is sent to a FIFO (b) 109.

As described in detail hereinafter, an address decoder 111 receives the signal addr' formed of the less significant 8 bits of the signal addr and refers to the bits 7-4 of the signal addr'. If the bits 7-4 are set to "0000", the less significant 4 bits are sent as a signal addr" (see FIG. 2C) to the register group 112 of the circuit A. Similarly, if the bits 7-4 of the signal addr' are set to "0001", the signal addr" is sent to the register group 113 of the circuit B, while if the bits 7-4 are set to "0010", the signal addr" is sent to the register group 114 of the circuit C. The 4-bit signal addr" indicates a register address.

As shown in FIG. 1, the signals req, ack, addr, and data are sent and received between the CPU 101 and the FIFO selector 103 of the CPU IF circuit 102 via a bus.

As described hereinbefore, the FIFO selector 103 selects a transmission destination of the signals req, ack, addr, and data based on the contents of the bits 9-8 of the signal addr. More specifically, when register configuration is to be performed for the register groups 112 to 114 of the respective circuits A, B, and C directly from the CPU 101, the bits 9-8 of the signal addr are set to "00", and hence the FIFO selector 103 selects the data selector 110. On the other hand, when a register configuration value is to be temporarily stored in the FIFO (a) 108 or the FIFO (b) 109 so as to perform register configurations simultaneously for the register groups 112 to 114, the bits 9-8 of the signal addr are set to "01" or "10", and hence the FIFO sector 103 selects the FIFO (a) 108 or the FIFO (b) 109.

Figure 3:
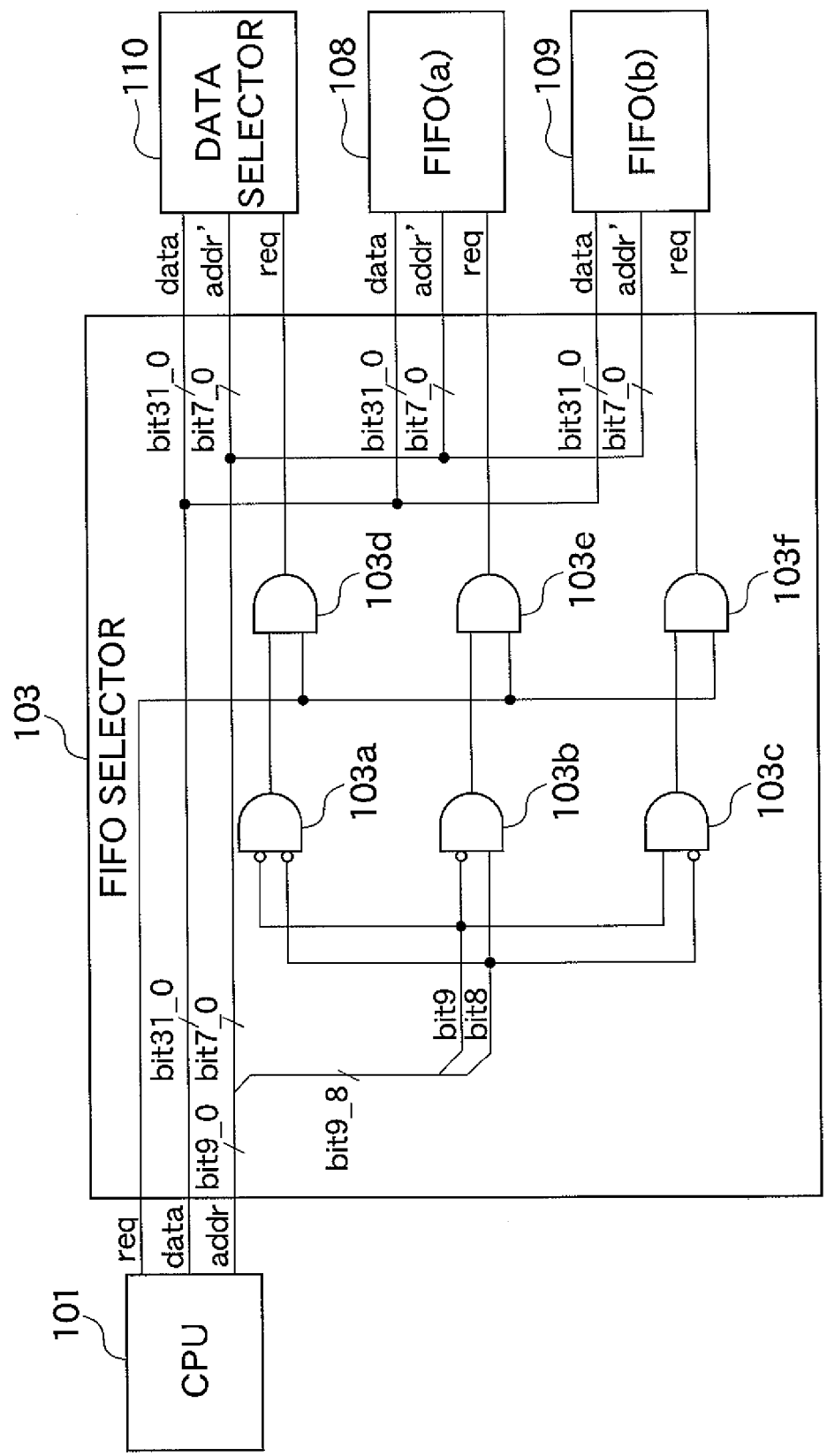
FIG. 3 is a circuit diagram of a FIFO selector.

FIG. 3 is a circuit diagram of the FIFO selector 103.

The FIFO selector 103 is comprised of AND elements 103a to 103f. Signals of the respective bits 9 and 8 of the signal addr from the CPU 101 are input to the two input terminals of each of the AND elements 103a to 103c, and each of the output terminals of the respective AND elements 103a to 103c is connected to one of the two input terminals included in each of AND elements 103d, 103e, and 103f. The signal req from the CPU 101 is inputted to the other of the input terminals included in each of the AND elements 103d to 103f. The respective output terminals of the AND elements 103d to 103f are connected to req terminals of the data selector 110, the FIFO (a) 108, and the FIFO (b) 109, respectively. A signal formed of the less significant 7-0 bits of the signal addr from the CPU 101 is sent as the signal addr' to the data selector 110, the FIFO (a) 108, and the FIFO (b) 109. The 32-bit signal data from the CPU 101 is also sent to the data selector 110, the FIFO (a) 108, and the FIFO (b) 109.

With this configuration, if the bits 9-8 of the signal addr are set to "00", the signal req from the CPU 101 is sent to the data selector 110 alone, and only the data selector 110 reads in the signal addr' formed of the bits 7-0 of the signal addr, and the signal data.

If the bits 9-8 of the signal addr are set to "01", the signal req is sent to the FIFO (a) 108 alone, and only the FIFO (a) 108 reads in the signal addr' and the signal data and stores these signals therein.

If the bits 9-8 of the signal addr are set to "10", the signal req is sent to the FIFO (b) 109 alone, and only the FIFO (b) 109 reads in the signal addr' and the signal data and stores these signals therein.

Referring again to FIG. 1, a signal path through a vertical synchronization signal generator SSG (a) 117, an updating pulse generating circuit (a) 104, and the FIFO (a) 108 is for image pickup, while a signal path through a vertical synchronization signal generator SSG (b) 118, an updating pulse generating circuit (b) 105, and the FIFO (b) 109 is for display driving. The vertical synchronization signal generator SSG (a) 117 and the vertical synchronization signal generator SSG (b) 118 are driven independently by a quartz oscillator (a) 119 and a quartz oscillator (b) 120, respectively. The vertical synchronization signal generator SSG (a) 117 outputs a vertical synchronization signal VD (a) 115 for an image pickup system. The vertical synchronization signal generator SSG (b) 118 outputs a vertical synchronization signal VD (b) 116 for a display driving system. The vertical synchronization signal VD (a) 115 is delivered to the updating pulse generating circuit (a) 104, while the vertical synchronization signal VD (b) 116 is delivered to the updating pulse generating circuit (b) 105.

The updating pulse generating circuit (a) 104 generates an updating pulse (a) 106 synchronous with the vertical synchronization signal VD (a) 115 delivered by the vertical synchronization signal generator SSG (a) 117, and delivers the updating pulse (a) 106 to the FIFO (a) 108. The updating pulse (a) 106 is generated during a V blanking period (non-display period), referred to hereinafter.

The updating pulse generating circuit (b) 105 generates an updating pulse (b) 107 synchronous with the vertical synchronization signal VD (b) 116 delivered by the vertical synchronization signal generator SSG (b) 118, and delivers the same to the FIFO (b) 109. The updating pulse (b) 107 is generated during the V blanking period.

The updating pulse (a) 106 is sent to the FIFO (a) 108 e.g. after detecting the termination of the operation of the circuit C which is the last of the three circuits A to C to terminate its operation. On the other hand, the updating pulse (b) 107 is sent to the FIFO (b) 109 when timing for register configuration is identified by a counter set to synchronize with the vertical synchronization signal VD (b) 116 sent from the vertical synchronization signal generator SSG (b) 118.

Each of the FIFO (a) 108 and the FIFO (b) 109 in FIG. 1 which has received the signal req from the FIFO selector 103 stores the signal data and the signal addr, and send the signal ack to the FIFO selector 103.

When the updating pulse (a) 106 is sent to the FIFO (a) 108 or the updating pulse (b) 107 to the FIFO (b) 109, the FIFO (a) 108 or the FIFO (b) 109 having received the updating pulse (a) or (b) sends not only the signal req but also the signal data and the signal addr' stored therein to the data selector 110. The data selector 110 having received these signals sends the signal ack to the FIFO (a) 108 or the FIFO (b) 109 having sent the signals.

Figure 4:
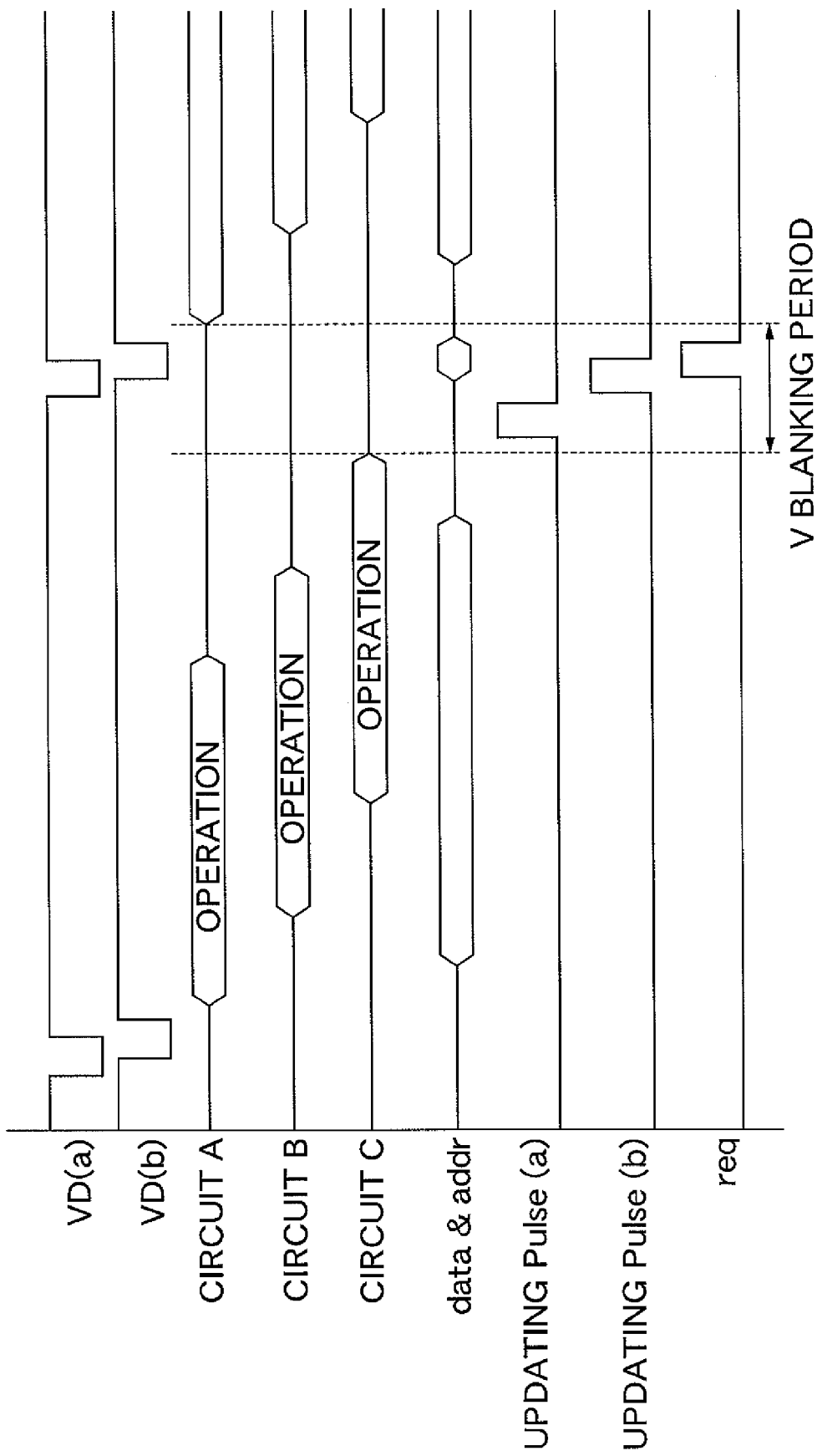
FIG. 4 is a timing diagram illustrating timing in which a data selector receives a signal req, a signal data, and a signal addr'.

FIG. 4 is a timing diagram illustrating timing in which the data selector 110 receives the signal req, the signal data, and the signal addr'.

In the case where register configuration is performed from each of the FIFO (a) 108 and the FIFO (b) 109, the signal req is sent to each of the FIFO (a) 108 and the FIFO (b) 109 from the CPU 101 via the FIFO selector 103 during the operations of the circuits A, B, and C. As a consequence, the signal data and the signal addr' sent from the CPU 101 via the FIFO selector 103 are written into each of the FIFO (a) 108 and the FIFO (b) 109. Then, when the updating pulse (a) 106 or the updating pulse (b) 107 is sent to the FIFO (a) 108 or the FIFO (b) 109 during the V blanking period (during which no effective video signals are output from the image pickup element), the FIFO (a) 108 or the FIFO (b) 109 sends the signal req, and the signal data and the signal addr' stored therein to the data selector 110.

When register configuration is performed directly from the CPU 101 for a register that has influence on a display image in the image display device or a readout video signal in the image pickup device, the CPU 101 sends the signal req, the signal data, and the signal addr' to the data selector 110 via the FIFO selector 103 during the V blanking period of the image display device or a blanking period of the image pickup device.

Of course, insofar as a register that does not have influence on a display image in the image display device or a readout video signal in the image pickup device is concerned, the CPU 101 can send the signal req, the signal data, and the signal addr' to the data selector 110 via the FIFO selector 103 at any time as required.

Next, arbitration (mediation for a plurality of register configuration requests) by the data selector 110 will be described with reference to FIGS. 5 and 6.

Figure 5:
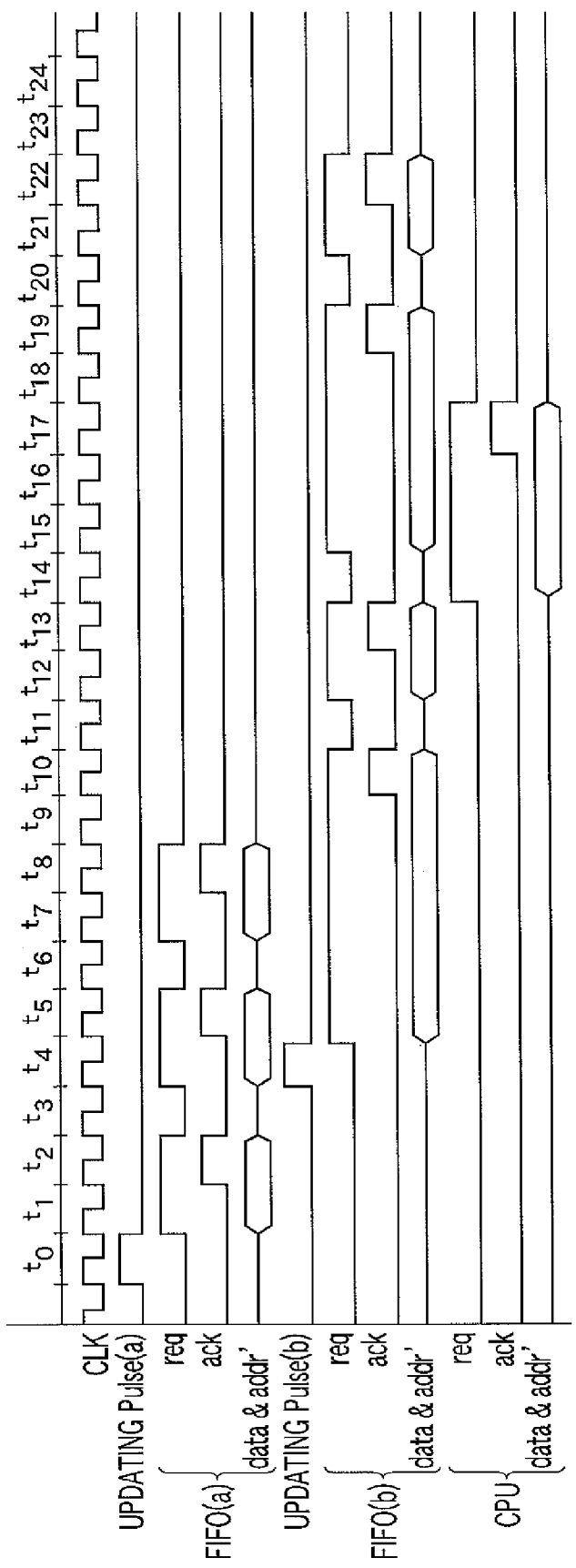
FIG. 5 is a timing diagram illustrating how the data selector performs reception arbitration processing when register configuration value information is received from a CPU, a FIFO (a), and a FIFO (b)

FIG. 5 is a timing diagram illustrating how the data selector 110 performs reception arbitration processing when register configuration value information is received from the CPU 101, the FIFO (a) 108, and the FIFO (b) 109.

It is assumed that priorities in register configuration are set such that CPU 101>FIFO (a) 108>FIFO (b) 109 holds.

In timing $t_0$, the updating pulse (a) 106 is delivered from the updating pulse generating circuit (a) 104 to the FIFO (a) 108.

In timing $t_1$, the signal req, the signal data, and the signal addr' are sent from the FIFO (a) 108 to the data selector 110, and in timing $t_2$, the data selector 110 reads in the signal data and the signal addr', and sends the signal ack to the FIFO (a) 108. In timing $t_3$, the signal req goes low.

Then, when the updating pulse (b) 107 is delivered from the updating pulse generating circuit (b) 105 to the FIFO (b) 109 in timing $t_4$ while the data selector 110 is receiving the signal req from the FIFO (a) 108, the FIFO (b) 109 sends the signals req, data, and addr' to the data selector 110 in timing $t_5$. However, since the FIFO (a) 108 has a higher priority over the FIFO (b) 109, the data selector 110 does not accept the signal req from the FIFO (b) 109.

Thereafter, when the signal req from the FIFO (a) 108 stops in timing $t_8$, the data selector 110 receives the signal req from the FIFO (b) 109 in timing $t_9$. Then, in timing $t_{10}$, the data selector 110 reads in the signals data and addr', and sends the signal ack to the FIFO (b) 109.

When the data selector 110 receives the signal req from the CPU 101 in timing $t_{14}$ while receiving the signal req from the FIFO (b) 109, since register configuration from the CPU 101 is given top priority, the data selector 110 accepts the signal req not from the FIFO (b) 109 but from the CPU 101 in timing $t_{15}$. Then, in timing $t_{17}$, the data selector 110 reads in the signals data and addr' from the CPU 101, and sends the signal ack to the FIFO selector 103. It should be noted that it takes several clock cycles before the data selector 110 sends the signal ack in the timing $t_{17}$ after having received the signal req from the CPU 101 in the timing $t_{14}$ because the signals data and addr' are sent from the CPU 101 to associated registers through several stages of circuits.

When reception of the signals data and addr' from the CPU 101 is completed in the timing $t_{17}$, the data selector 110 restarts reception of the signals data and addr' from the FIFO (b) 109 in timing $t_{18}$. The signal req from the FIFO (b) 109 has been continuously being transmitted, and hence the data selector 110 reads in the signals data and addr' from the FIFO (b) 109 in timing $t_{19}$ and then sends the signal ack to the FIFO (b) 109.

From then on, the data selector 110 repeatedly reads in signals data and addr' remaining in the FIFO (b) 109, and then sends the signal ack back to the FIFO (b) 109.

Referring again to FIG. 1, when receiving the signals data and addr' from the FIFO selector 103, the FIFO (a) 108, or the FIFO (b) 109, the data selector 110 sends a signal write command (hereinafter referred to as "the signal wr_cmd") and the signals data and addr' to the address decoder 111.

Figure 6:
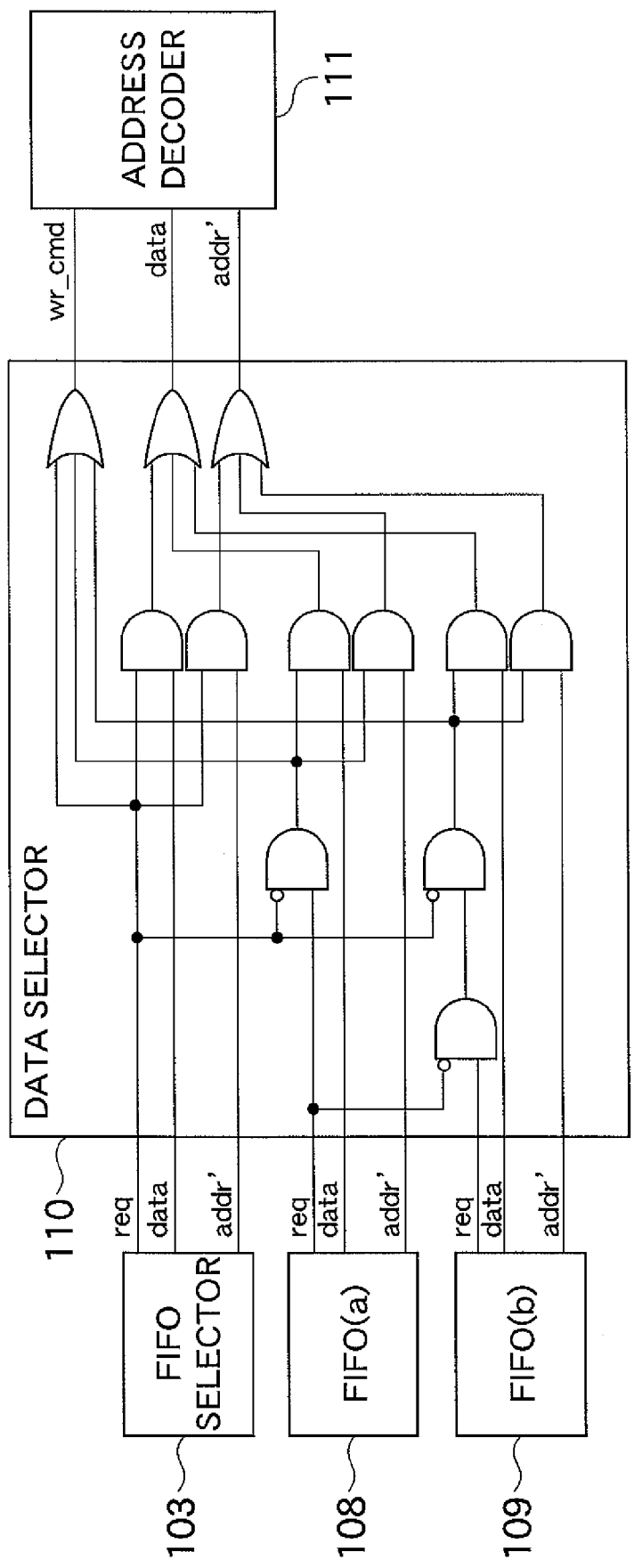
FIG. 6 is a circuit diagram of a data selector.

FIG. 6 is a circuit diagram of the data selector 110 that performs reception arbitration as described above.

It is assumed that priorities in register configuration are the same as those set in FIG. 5, i.e. set such FIFO selector (CPU 101)>FIFO (a) 108>FIFO (b) 109 holds.

The data selector 110 is formed by a logic circuit shown in FIG. 6, so that if the signal req from the FIFO (b) 109 is high when the signals req from the FIFO selector 103 and the FIFO (a) 108 are low, the signal req from the FIFO (b) 109 is sent as the signal wr_cmd to the address decoder 111, and the address decoder 111 receives the signals data and addr' from the FIFO (b) 109.

On the other hand, if the signal req from the FIFO selector 103 is low, and the signal req from the FIFO (a) 108 is high, the signal req from the FIFO (a) 108 is sent as the signal wr_cmd to the address decoder 111 irrespective of whether or not the signal req is output from the FIFO (b) 109, and the address decoder 111 receives the signals data and addr' from the FIFO (a) 108.

Further, if the signal req from the FIFO selector 103 is high, this signal req is sent as the signal wr_cmd to the address decoder 111 irrespective of whether or not the signal req is output from the FIFO (a) 108 or the FIFO (b) 109, and the address decoder 111 receives the signals data and addr' from the FIFO selector 103.

Figure 7:
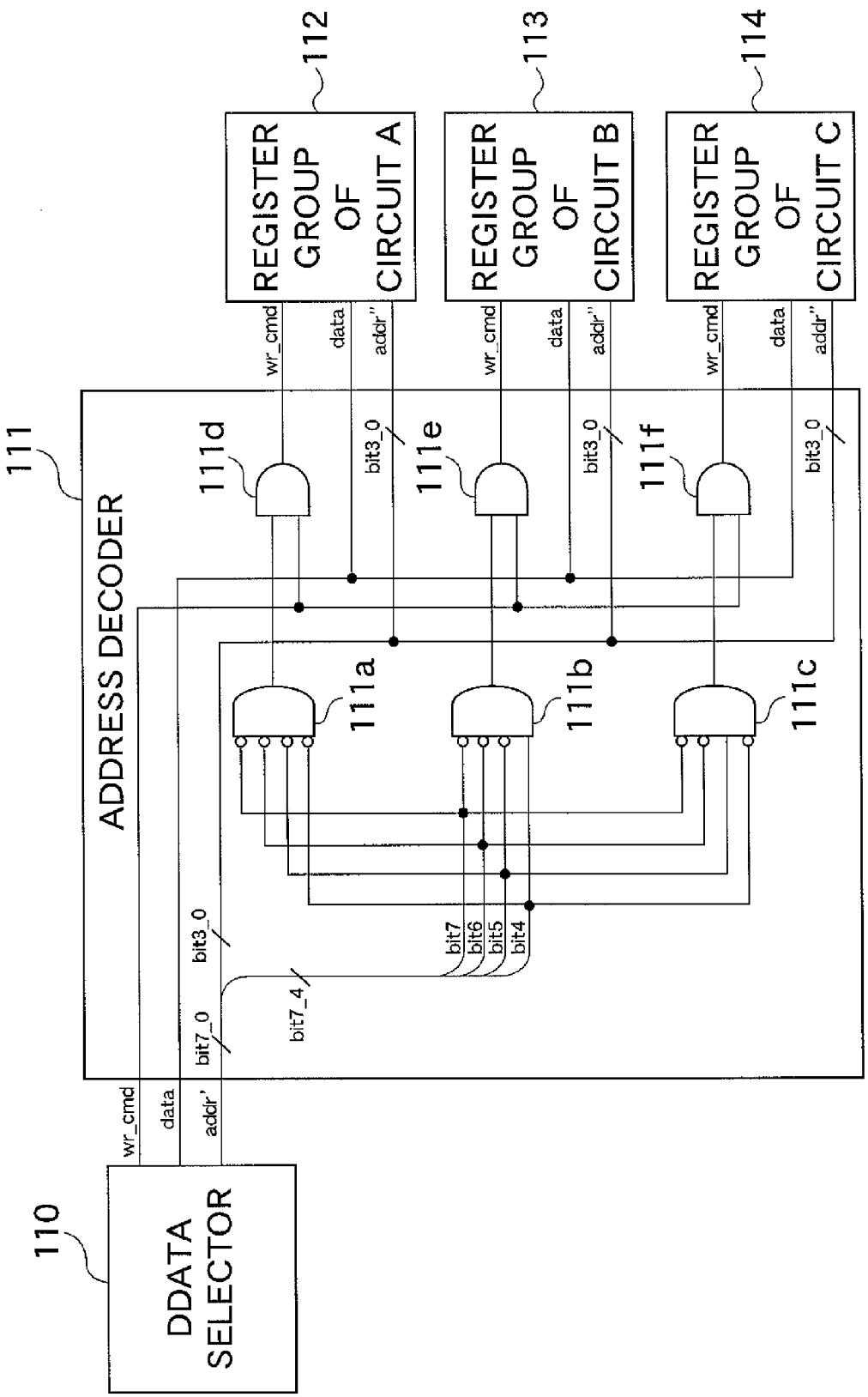
FIG. 7 is a circuit diagram of an address decoder.

FIG. 7 is a circuit diagram of the address decoder 111.

As described hereinbefore with reference to FIGS. 2A to 2C, the address decoder 111 refers to the bits 7-4 of the signal addr'. When the bits 7-4 of the signal addr' are set to "0000", the address decoder 111 selects the register group 112 of the circuit A as a transmission destination, and when the bits 7-4 are set to "0001", the address decoder 111 selects the register group 113 of the circuit B as a transmission destination. Further, when the bits 7-4 are set to "0010", the address decoder 111 selects the register group 114 of the circuit C as a transmission destination.

Referring to FIG. 7, the address decoder 111 is comprised of AND elements 111a to 111f. Bit signals of the respective bits 7-4 of the 8-bit signal addr' sent from the data selector 110 are input to the respective four input terminals of each of the AND elements 111a to 111c. A signal formed of the bits 3-0 of the signal addr' is sent as a signal addr" to the register groups 112 to 114 of the respective circuits A, B, and C. The output terminals of the respective AND elements 111a to 111c are connected to respective ones of input terminals of the AND elements 111*d* to 111*f*, and the signal wr_cmd from the data selector 110 is input to the respective others of the input terminals of the AND elements 111*d* to 111*f*. The signal data from the data selector 110 is sent to the respective register groups 112 to 114 of the circuits A, B, and C.

In the address decoder 111 configured as above, when the bits 7-4 of the signal addr' are set to "0000", the signal wr_cmd is output from the AND element 111*d* to the register group 112 of the circuit A, whereby the register group 112 of the circuit A reads in the signals data and addr".

When the bits 7-4 of the signal addr' are set to "0001", the signal wr_cmd is output from the AND element 111*e* to the register group 113 of the circuit B, whereby the register group 113 of the circuit B reads in the signals data and addr".

Further, when the bits 7-4 of the signal addr' are set to "0010", the signal wr_cmd is output from the AND element 111*f* to the register group 114 of the circuit C, whereby the register group 114 of the circuit C reads in the signals data and addr".

Referring again to FIG. 1, when each of the register group 112 of the circuit A, the register group 113 of the circuit B, and the register group 114 of the circuit C, which has received the signal wr_cmd, writes the signal data in a register address indicated by the bits 3-0 of the signal addr", whereby register configuration is performed.

As described above, according to the first embodiment, the CPU IF circuit 102 configured as shown in FIG. 1 has the FIFO (a) 108 and the FIFO (b) 109 provided therein for temporarily storing resister configuration values for the register groups 112 to 114 of the circuits A to C, whereby the register configuration values sent during a display period are temporarily stored in the FIFO (a) 108 and the FIFO (b) 109 by referring to bit data of the signal addr, and then during a V blanking period (non-display period) following the display period, register configurations can be sequentially performed according to predetermined priorities, using the register configuration values sent directly from the CPU 101 and the register configuration values temporarily stored in the FIFO (a) 108 and the FIFO (b) 109. This makes it possible to carry out register configurations (updatings) simultaneously at high speed in designated timing within the V blanking period without increasing the circuit scale of the register configuration control device.

Next, a description will be given of a second embodiment of the present invention.

As shown in a memory map in FIG. 8, in the above described first embodiment, a memory associated with the bits 9-8 of the 10-bit address (addr) which are set to "11" is not used in a memory space formed by the whole of the register groups 112 to 114 of the circuits A to C. Further, memories which are assigned addresses indicated by the bits 7-0 set to respective values from "00110000" to "11111111" are not used in any of memory spaces associated with respective bits 9-8 of the address (addr) set to "00", "01", and "10".

Therefore, in the second embodiment, an address assigned to each memory space is formed of 8 bits, as shown in a memory map illustrated in FIG. 9. Register configuration is performed directly from a CPU when the bits 7-4 are set to "0000", "0001", or "0010", from a FIFO (a) when the bits 7-4 are set to "0011", and from a FIFO (b) when the bits 7-4 are set to "0101".

FIG. 10 is a block diagram of a register configuration control device according to the second embodiment.

In the second embodiment, a circuit corresponding to the FIFO selector 103 in the first embodiment does not exist within a CPU IF circuit 302, and the CPU 301 sends a signal req2, a 32-bit signal data2 or data2', and a 8-bit signal addr2 to a data selector 309 of the CPU IF circuit 302, and receives a signal ack2 from the data selector 309.

Also in the second embodiment, similarly to the first embodiment, register configuration for respective register groups 311 to 313 of the circuits A to C can be performed directly from the CPU 301 or from the FIFO (a) 307 and the FIFO (b) 308.

Figure 11:
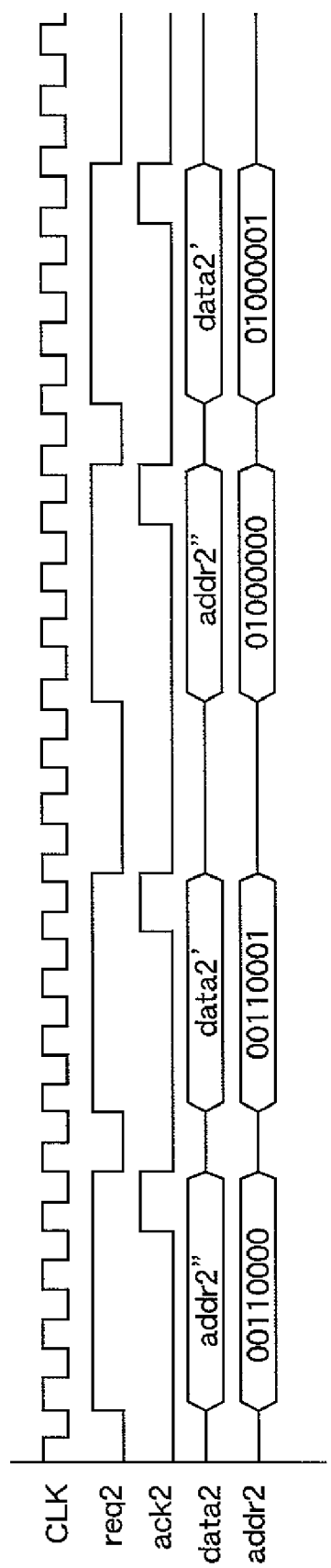
FIG. 11 is a timing diagram illustrating output timing in which each signal is output from the CPU in the case where register configuration is performed from the FIFO (a) and the FIFO (b)

FIG. 11 is a timing diagram illustrating output timing in which each of the signals is output from the CPU 301 in the case where register configuration is performed from the FIFO (a) 307 and the FIFO (b) 308.

When register configuration is to be performed from the FIFO (a) 307 and the FIFO (b) 308, the signal data2 consisting of a signal addr2" and the signal data2' is transmitted from the CPU 301 during the operations of the circuits A to C. The signal addr2" and the signal data2' are a pair of pieces of register configuration value information. The signal addr2" indicates a register address, and the signal data2' is a value to be written in a register.

First, when the signal req2 goes high for a first time, the signal addr2" is delivered, and immediately thereafter when the signal req2 goes high for a second time, the signal data2' is delivered. These two deliveries of the signals addr2" and data2' are performed in association with each of the FIFO (a) 307 and the FIFO (b) 308. According to the memory map shown in FIG. 9, the first two of four high level durations of the signal req2 shown in FIG. 9 are associated with the FIFO (a) 307, and the second two are associated with the FIFO (b) 308.

The destination of direct transmission of the signals addr2" and data2' from the CPU 301 is the data selector 309. The data selector 309 sends the signal ack2 to the CPU 301 whenever reception of each of the signals addr2" and data2' is completed.

At the same time, the 8-bit signal addr2 is transmitted from the CPU 301. When the bit 0 of the signal addr2 is set to "0", the signal addr2" is stored in the FIFO (a) 307 or the FIFO (b) 308, while when the bit 0 is set to "1", the signal data2' is stored in the FIFO (a) 307 or the FIFO (b) 308.

Figure 12:
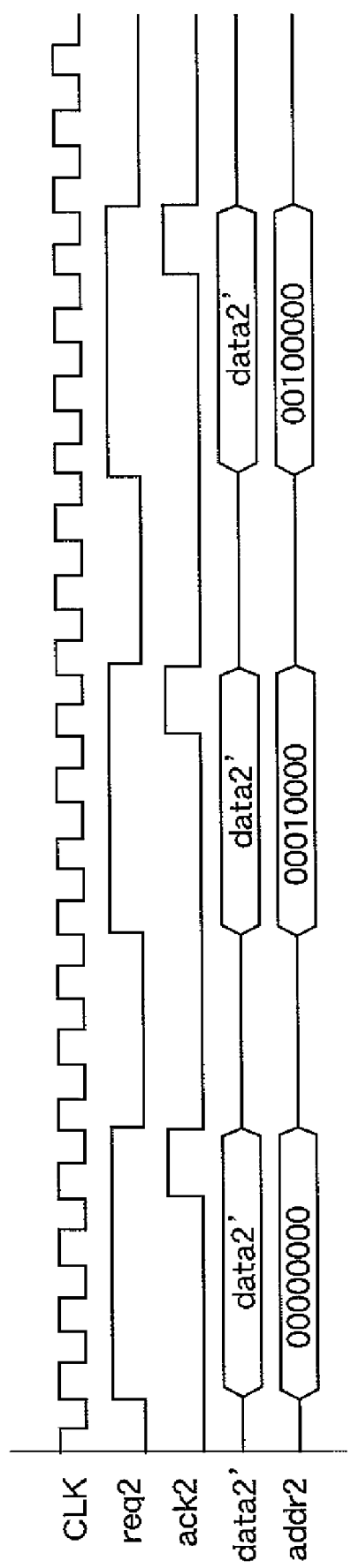
FIG. 12 is a timing diagram illustrating output timing in which each signal is output from the CPU in the case where register configuration is performed directly from the CPU.

FIG. 12 is a timing diagram illustrating output timing in which each of the signals is output from the CPU 301 in the case where register configuration is performed directly from the CPU 301.

When register configuration is to be performed directly from the CPU 301, the signal data2' to be written into one of the register groups of the respective circuits is transmitted from the CPU 301 when the signal req2 goes high.

At the same time, the signal addr2 indicative of the address of a register of the associated circuit, where the signal data2' is to be written, is delivered.

Figure 13:
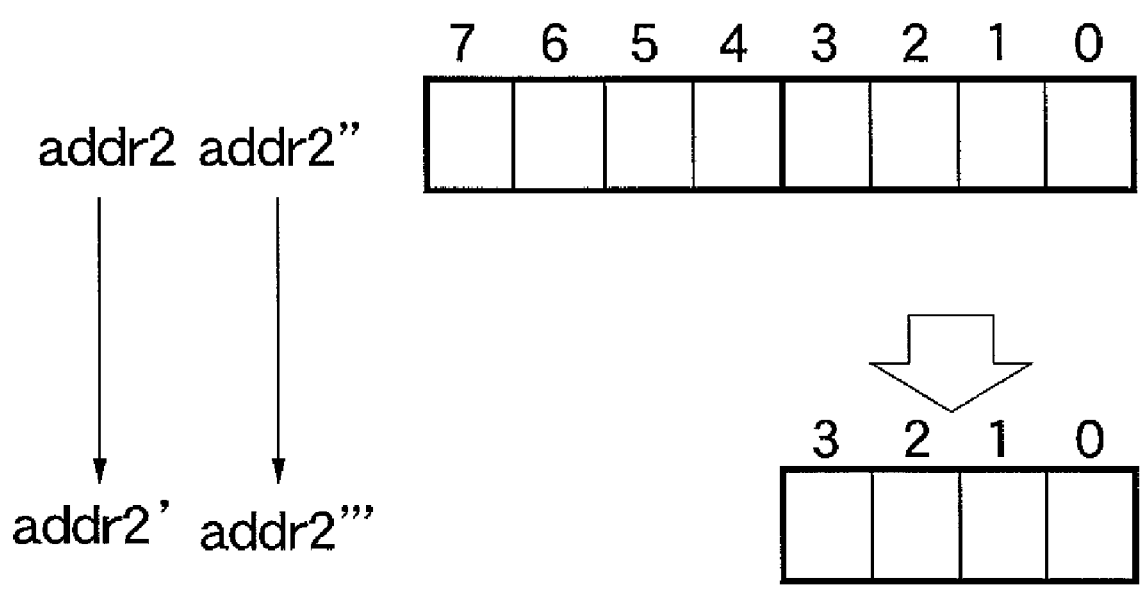
FIG. 13 is a diagram useful in explaining bit allocation of a 8-bit signal addr2 and a signal addr2"

FIG. 13 is a diagram illustrating bit allocation of the 8-bit signal addr2 and the 8-bit signal addr2". In the following, the register configuration control device shown in FIG. 10 will be described with reference to FIG. 13.

In the case where register configuration is performed directly from the CPU 301, an address decoder 310 appearing in FIG. 10 refers to the bits 7-4 of the signal addr2, and sends the bits 3-0 of the signal addr2 as a signal addr2' to a corresponding one of the respective register groups 311 to 313 of the circuits A to C. More specifically, when the bits 7-4 of the signal addr2 are set to "0000", the signal addr2' is sent to the register group 311 of the circuit A, and when the bits 7-4 are set to "0001", the signal addr2' is sent to the register group 312 of the circuit B. Further, when the bits 7-4 are set to "0010", the signal addr2' is sent to the register group 313 of the circuit C. At the same time, the signal data2' is also delivered.

On the other hand, in the case where resister configuration is performed from the FIFO (a) 307 and the FIFO (b) 308, when the bits 7-4 of the signal addr2 are set to "0011", the address decoder 310 sends the signals addr2" and data2' to the FIFO (a) 307, while when the bits 7-4 are set to "0100", the address decoder 310 sends the signals addr2" and data2' to the FIFO (b) 308.

Further, in the resister configuration performed from the FIFO (a) 307 and the FIFO (b) 308, the address decoder 310 refers to the bits 7-4 of the signal addr2" temporarily stored in each of the FIFO (a) 307 and the FIFO (b) 308, and sends the bits 3-0 of the signal addr2" as a signal addr'" to a corresponding one of the respective register groups 311 to 313 of the circuits A to C. More specifically, when the bits 7-4 of the signal addr2" are set to "0000", the signal addr'" is sent to the register group 311 of the circuit A, and when the bits 7-4 are set to "0001", the signal addr'" is sent to the register group 312 of the circuit B. Further, when the bits 7-4 are set to "0010", the signal addr'" is sent to the register group 313 of the circuit C. At the same time, the signal data2' is also delivered.

In short, when register configuration is to be performed directly from the CPU 301, the bits 7-4 of the signal addr2 indicate an address for selecting one of the respective register groups 311 to 313 of the circuits A to C, whereas when register configuration is to be performed from each of the FIFOs, the bits 7-4 of the signal addr2 indicate an address for selecting the FIFO (a) 307 or the FIFO (b) 308.

The signal addr2' is formed of the bits 3-0 of the signal addr2. When register configuration is to be performed directly from the CPU 301, the signal addr2' indicates a register address in each circuit, whereas when register configuration is to be performed from the FIFOs, the signal addr2' indicates a FIFO address.

The signal addr2" indicates a register address in the circuit of each of the FIFOs, and the bits 7-4 of the signal addr2" indicates an address for selecting one of the respective register groups 311 to 313 of the circuits A to C.

The signal addr2'" is formed of the bits 3-0 of the signal addr2", and indicates a register address in each circuit.

Next, the operation of the register configuration control device for writing the signal data2' into a register directly from the CPU 301 will be described with reference to FIG. 10.

When register configuration is to be performed directly from the CPU 301, the signals req2, ack2, addr2, and data2' are transmitted and received between the CPU 301 and the data selector 309.

Figure 14:
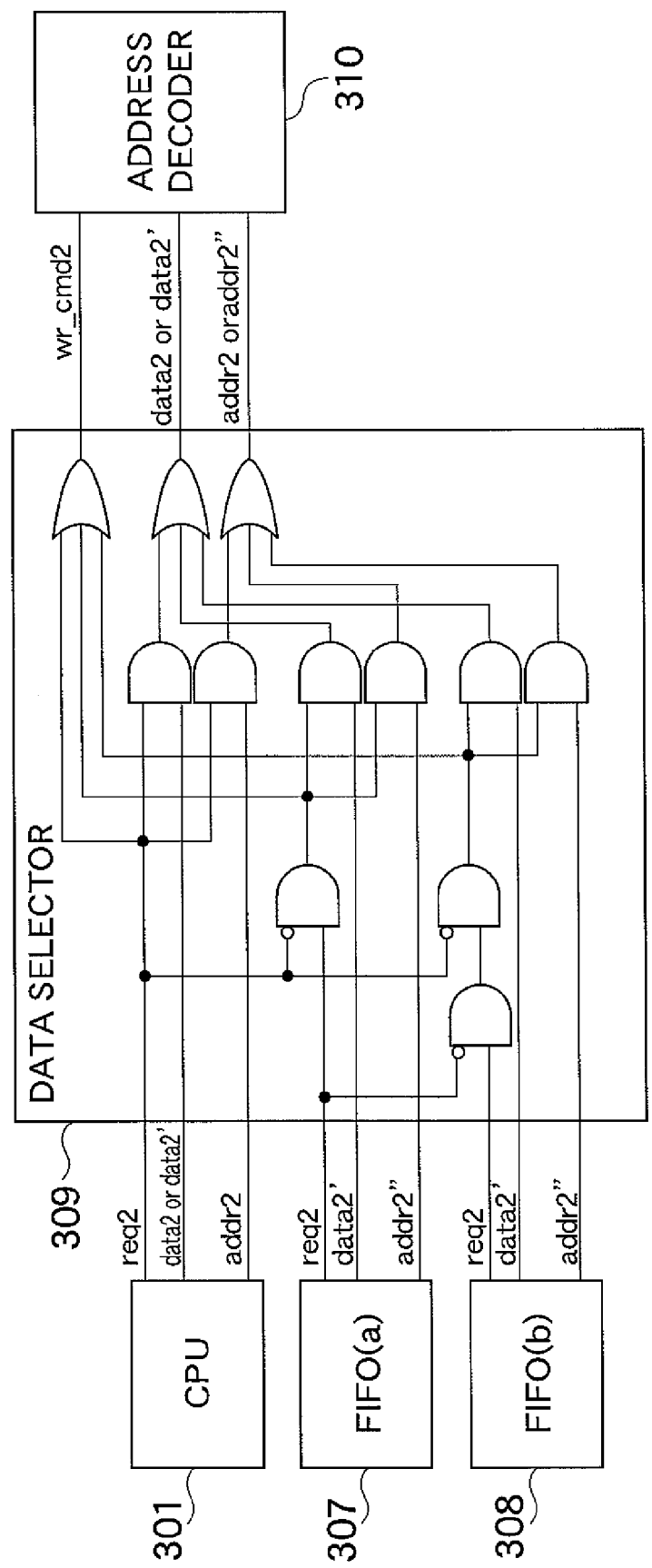
FIG. 14 is a circuit diagram of a data selector.

FIG. 14 is a circuit diagram of the data selector 309.

The data selector 309 is formed by a logic circuit shown in FIG. 14. The arrangement of the data selector 309 is the same as that of the data selector 110 described with reference to FIG. 6 in the first embodiment.

In the case where register configuration is performed directly from the CPU 301, if priorities in register configuration are set such that CPU 301>FIFO (a) 307>FIFO (b) 308 holds, the operation of the data selector 309 is the same as that of the data selector 110 in the first embodiment, and therefore a signal wr_cmd2, the signal data2', and the signal addr2 are sent from the data selector 309 to the address decoder 310.

Figure 15:
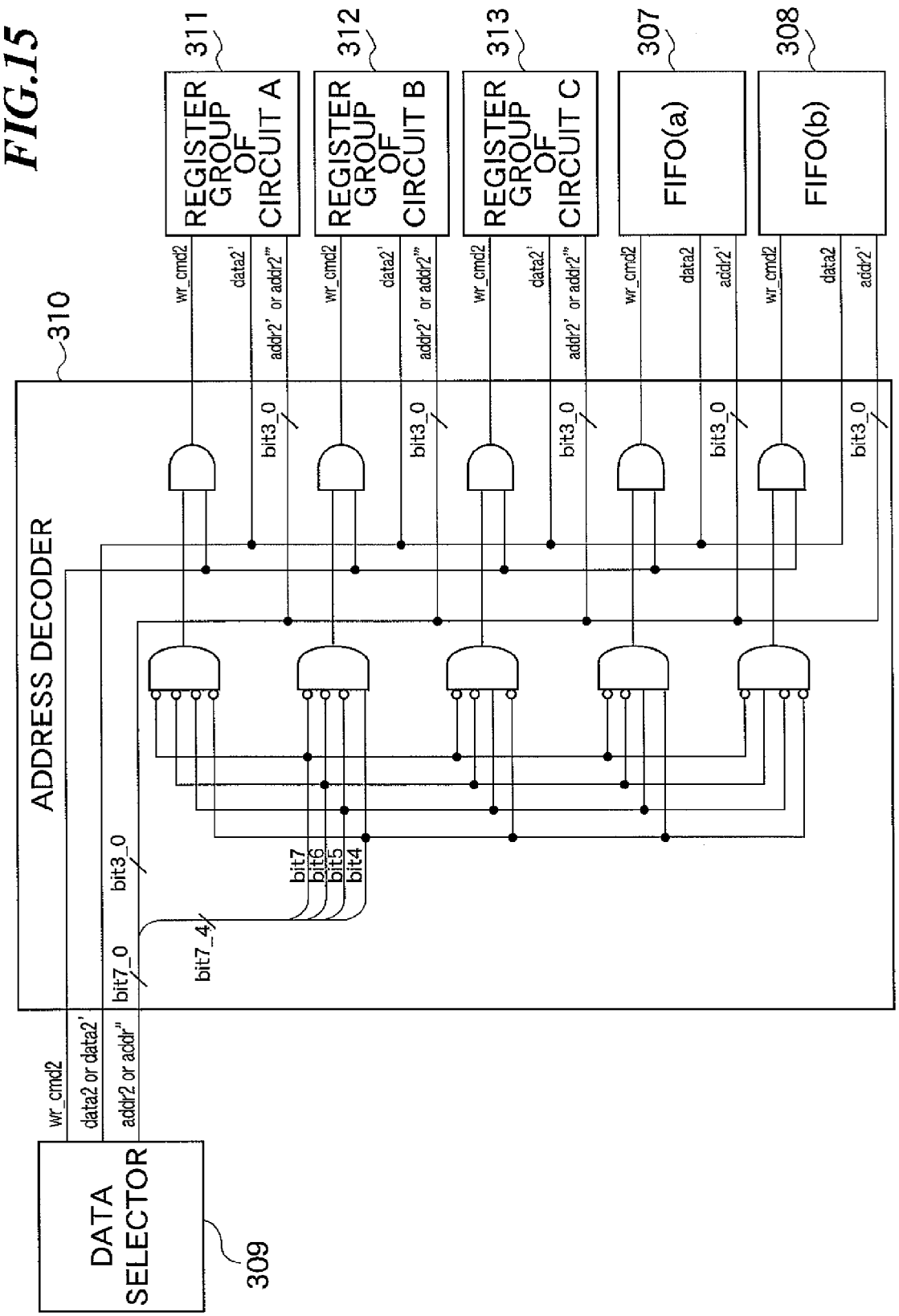
FIG. 15 is a circuit diagram of an address decoder.
Figure 16:
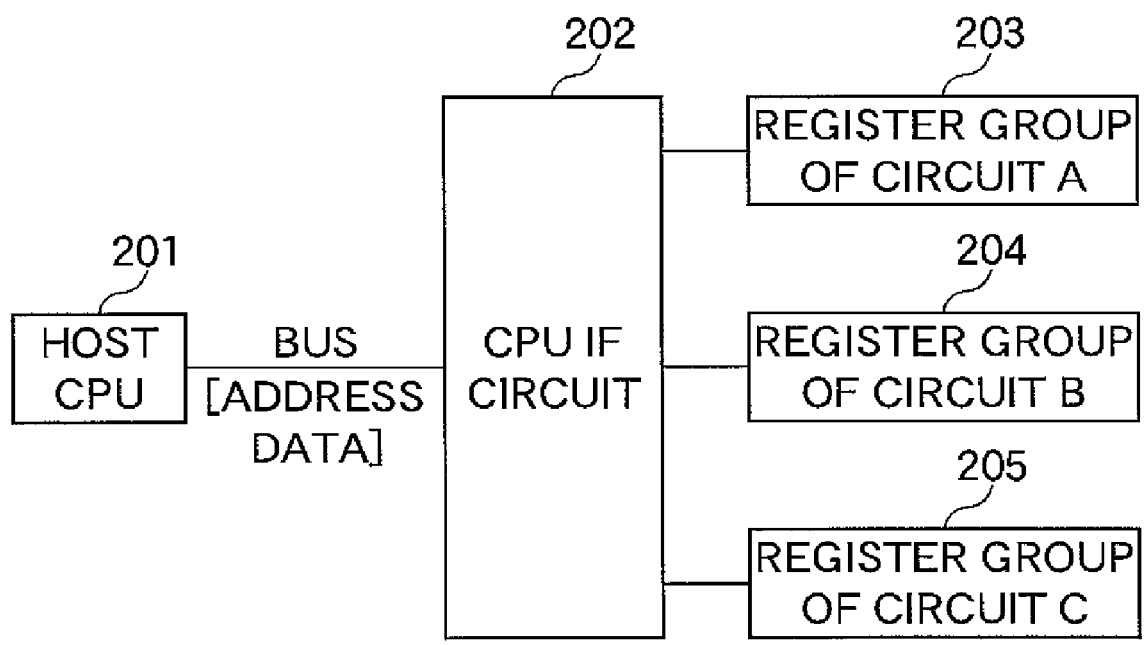
FIG. 16 is a block diagram of a conventional display processing device.
Figure 17:
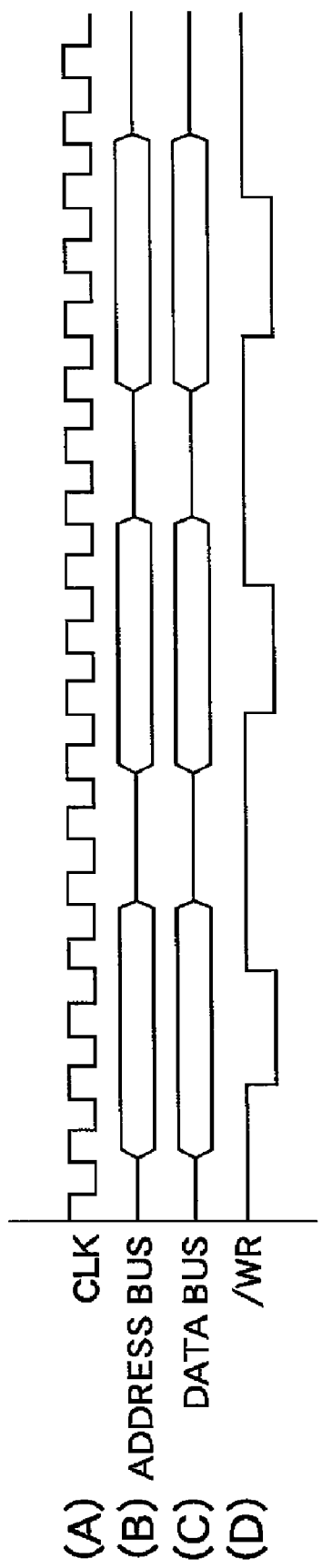
FIG. 17 is a timing diagram illustrating transmission of register configuration value information to register groups from a host CPU and writing (updating) of the same into the register groups by the host CPU.

FIG. 15 is a circuit diagram of the address decoder 310.

The address decoder 310 refers to the bits 7-4 of the signal addr2 sent from the data selector 309 to select a transmission destination of the signal addr2' formed of the bits 3-0 of the signal addr2 and the signal data2'.

When register configuration is to be performed directly from the CPU 301, the bits 7-4 of the signal addr2 are set to "0000", "0001", or "0010". When the bits 7-4 of the signal addr2 are set to "0000", the address decoder 310 selects the register group 311 of the circuit A, and when the bits 7-4 of the same are set to "0001", the address decoder 310 selects the register group 312 of the circuit B. Further, when the bits 7-4 of the same are set to "0010", the address decoder 310 selects the register group 313 of the circuit C.

As a consequence, if the bits 7-4 of the signal addr2 are set to "0000", when the signal wr_cmd2 is input to the register group 311 of the circuit A, the signal data2' is written into a register which is assigned an address indicated by the signal addr2'.

If the bits 7-4 of the signal addr2 are set to "0001", when the signal wr_cmd2 is input to the register group 312 of the circuit B, the signal data2' is written into a register which is assigned an address indicated by the signal addr2'.

Further, if the bits 7-4 of the signal addr2 are set to "0010", when the signal wr_cmd2 is input to the register group 313 of the circuit C, the signal data2' is written into a register which is assigned an address indicated by the signal addr2'.

Next, a description will be given of the operation of the register configuration control device shown in FIG. 10 in the case where register configuration is performed from the FIFO (a) 307 or the FIFO (b) 308.

When register configuration is to be performed from the FIFO (a) 307 or the FIFO (b) 308, the bits 7-4 of the signal addr2 as an address value of a memory space, which is sent from the CPU 301, are set to "0011" or "0100" as shown in FIG. 9, and hence the address decoder 310 in FIG. 15 selects the FIFO (a) 307 or the FIFO (b) 308.

More specifically, when the bits 7-4 of the signal addr2 are set to "0011", the signals wr_cmd2, data2', and addr2" are sent to the FIFO (a) 307.

On the other hand, when the bits 7-4 of the signal addr2 are set to "0100", the signals wr_cmd2, data2', and addr2" are sent to the FIFO (b) 308.

In these cases, as shown in FIG. 11, values sent as the signal data2 from the CPU 301 through a data bus are the signal addr2" indicative of a register address in a corresponding one of the circuits and the signal data2 indicative of a value to be written in the corresponding register. The signal addr2" and the signal data2' are written into the FIFOs during the two high-level durations of the signal wr_cmd2 sent from the address decoder 310.

Further, since the signal addr2" and the signal data2' are stored in respective addresses adjacent to each other in each of the FIFOs as shown in FIG. 9, the bit 0 of the signal addr2 indicative of the address of each FIFO for storing the signal addr2" is set to "0", and the bit 0 of the signal addr2 indicative of the address of each FIFO for storing the signal data2 is set to "1".

Upon reception of the first signal wr_cmd2, each of the FIFOs refers to the signal addr2 having the bit 0 set to "0", and stores the signal addr2" sent through the data bus in the designated FIFO address.

Further, upon reception of the second signal wr_cmd2, each of the FIFOs refers to the signal addr2 having the bit 0 set to "1", and stores the signal data2' sent through the data bus in the FIFO address adjacent to the address where the signal addr2" is stored.

Similarly to the first embodiment, an updating pulse generating circuit (a) 303 generates an updating pulse (a) 305 synchronous with a vertical synchronization signal VD (a) 314 for an image pickup system, which is received from an SSG (a) 316, and the signals addr2" and data2' stored in the FIFO (a) 307 are sent to the data selector 309 in synchronism with generation of the updating pulse (a) 305.

Also, similarly to the first embodiment, an updating pulse generating circuit (b) 304 generates an updating pulse (b) 306 synchronous with a vertical synchronization signal VD (b) 315 for a display system, which is received from an SSG (b) 317, and the signals addr2" and data2' stored in the FIFO (b) 308 are sent to the data selector 309 in synchronism with generation of the updating pulse (b) 306.

As shown in FIG. 14, the data selector 309 sends the signals addr2" and data2' stored in each of the FIFO (a) 307 and the FIFO (b) 308 to the address decoder 310 in synchronism with delivery of the signal req from the FIFO (a) 307 or the FIFO (b) 308, according to the predetermined priorities set for register configuration such that CPU 301>FIFO (a) 307>the FIFO (b) 308 holds.

Upon reception of the signals addr2" and data2' stored in each of the FIFO (a) 307 and the FIFO (b) 308, the address decoder 310 refers to the value of the signal addr2".

In this case, the bits 7-4 of the signal addr2" are set to "0000", "0001", or "0010" as shown in FIG. 9. Therefore, the address decoder 310 selects the register group 311 of the circuit A, the register group 312 of the circuit B, or the register group 313 of the circuit C according to the bits 7-4 of the signal addr2", and then sends the signal wr_cmd2, the signal data2', and the signal addr2'" formed of the bits 3-0 of the signal addr2" to the selected register group.

As a consequence, if the bits 7-4 of the signal addr2" are set to "0000", when the signal wr_cmd2 is input to the register group 311 of the circuit A, the signal data2' is written into a register address indicated by the signal addr2'".

If the bits 7-4 of the signal addr2" are set to "0001", when the signal wr_cmd2 is input to the register group 312 of the circuit B, the signal data2' is written into a register address indicated by the signal addr2'".

Further, if the bits 7-4 of the signal addr2" are set to "0010", when the signal wr_cmd2 is input to the register group 313 of the circuit C, the signal data2' is written into a register address indicated by the signal addr2'".

As described above, in the second embodiment as well, by configuring the CPU IF circuit 302 as shown in FIG. 10, it is possible to carry out register configurations (updatings) simultaneously at high speed in designated timing within a V blanking period (non-display period) without increasing the circuit scale of the register configuration control device.

Further, according to the second embodiment, since the areas of the memory space adjacent to the addresses associated with the register groups of the respective circuits A, B, and C are used as FIFOs, it is possible to concentrate memory areas for use in register configuration, thereby reduce the memory space used for FIFO.

Next, a third embodiment of the present invention will be described.

In the following, a description will be given of how register configuration values having written in the FIFO 108 within the CPU IF circuit 102 during a video image pickup period are simultaneously set in some blocks in the image pickup apparatus, such as a digital camera, at high speed during the vertical blanking period.

Figure 18:
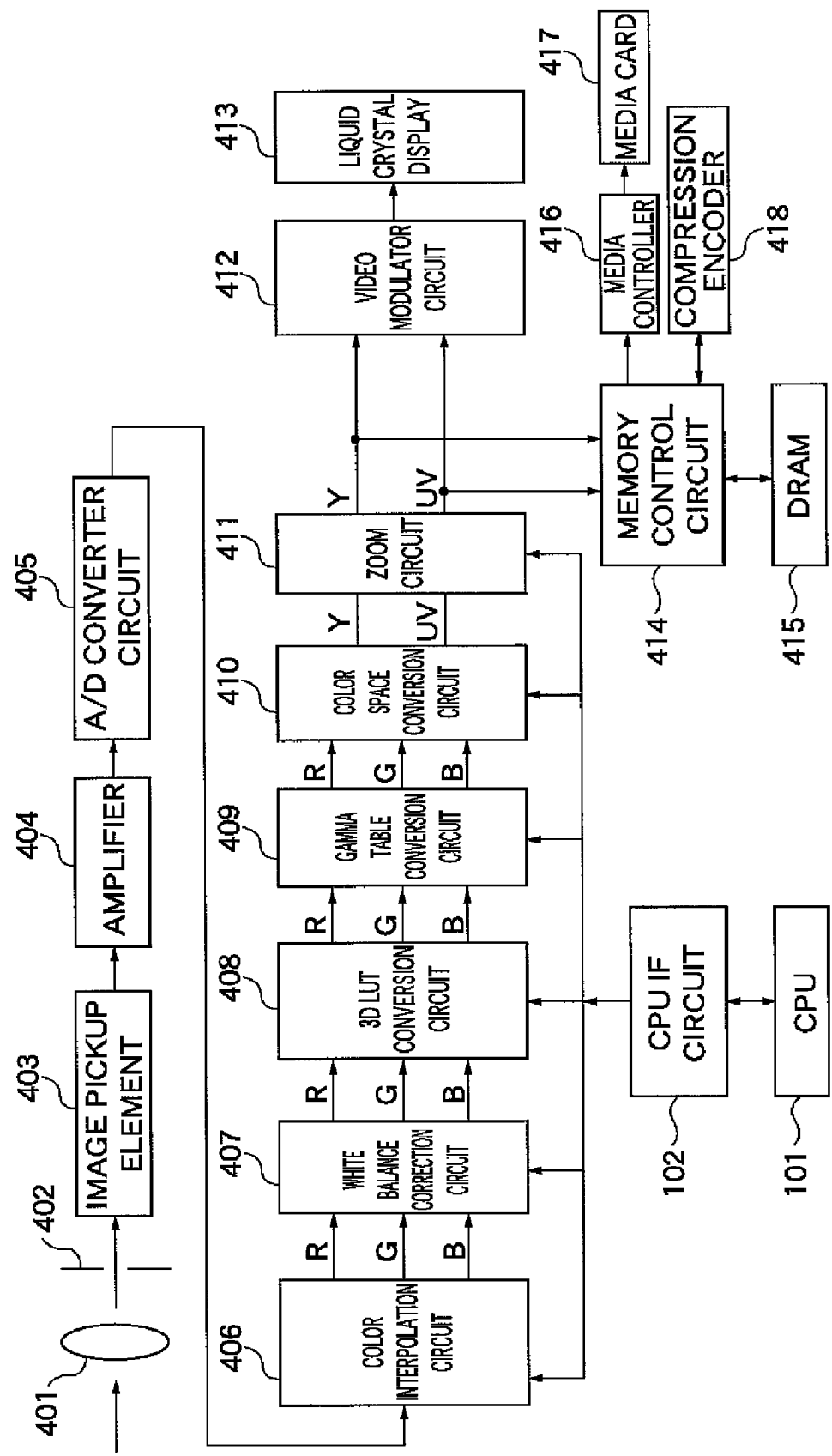
FIG. 18 is a block diagram of an image pickup apparatus in a third embodiment of the present invention.

FIG. 18 is a block diagram of the image pickup apparatus according to the third embodiment.

In FIG. 18, reference numeral 401 designates a lens, 402 a diaphragm, 403 an image pickup element that performs photoelectrical conversion, 404 an amplifier that performs amplification, noise removal, etc. on electric signals output from the image pickup element 403, 405 an A/D converter circuit that coverts an analog signal output from the amplifier 404 into a digital signal, 406 a color interpolation circuit that interpolates the digital signal from an RGB Bayer array into pixel-by-pixel (R, G, B) signals, 407 a white balance correction circuit that corrects white balance of the RGB signals, 408 a 3D lookup table conversion (hereinafter referred to as "the 3D LUT conversion") circuit that performs color tone conversion, 409 a gamma table conversion circuit that applies gamma to the RGB signals, 410 a color space conversion circuit that performs color space conversion of the RGB signals input thereto into luminance and color difference signals, 411 a zoom circuit that performs reduction and magnification of image data, 101 a CPU that issues register configuration values for circuits, 102 a CPU IF circuit that incorporates the FIFOs 108 and 109 described in the first embodiment and sets the register configuration values output from the CPU 101 in registers of circuits thereof, 413 a liquid crystal display that displays video signals, 412 a video modulator circuit that performs modulation for displaying image data on the liquid crystal display 413, 415 a DRAM that temporarily stores image data subjected to signal processing, 414 a memory control circuit that performs bus arbitration between the DRAM 113 and the circuits, 418 a compression circuit that compresses picked-up image data, 417 a media card that records image data compressed in the compression circuit 418, and 416 a media controller circuit that provides interface with the media card 417.

A description will now be given of the operation of the image pickup apparatus shown in FIG. 18.

A subject image entering the lens 401 is adjusted in the amount of light, and is converted by the image pickup element 403 into an electric signal.

The electric signal output from the image pickup element 403 is subjected to processing including amplification and noise removal by the amplifier 404, and then converted from an analog signal to a digital signal by the A/D converter circuit 405.

The color interpolation circuit 406 interpolates the digital image data output from the A/D converter circuit 405 such that an RGB Bayer array thereof is changed into pixel-by-pixel (R, G, B) signals, which are output as the RGB signals.

Figure 21:
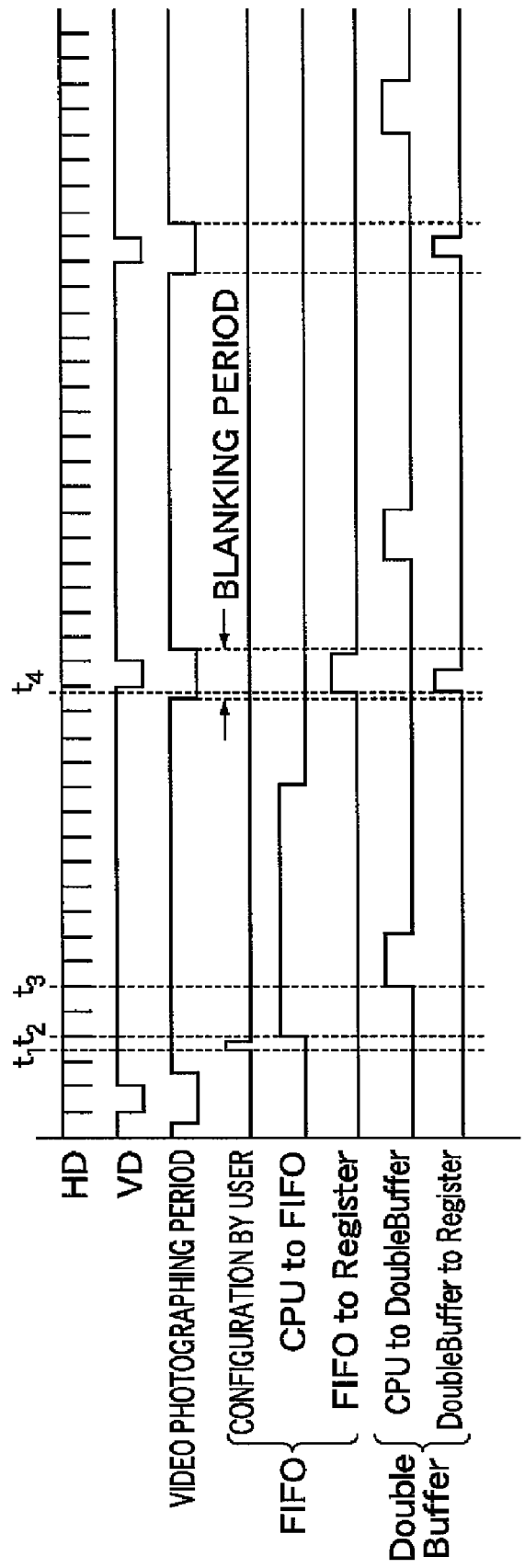
FIG. 21 is a diagram illustrating timing for register configuration.
Figure 22:
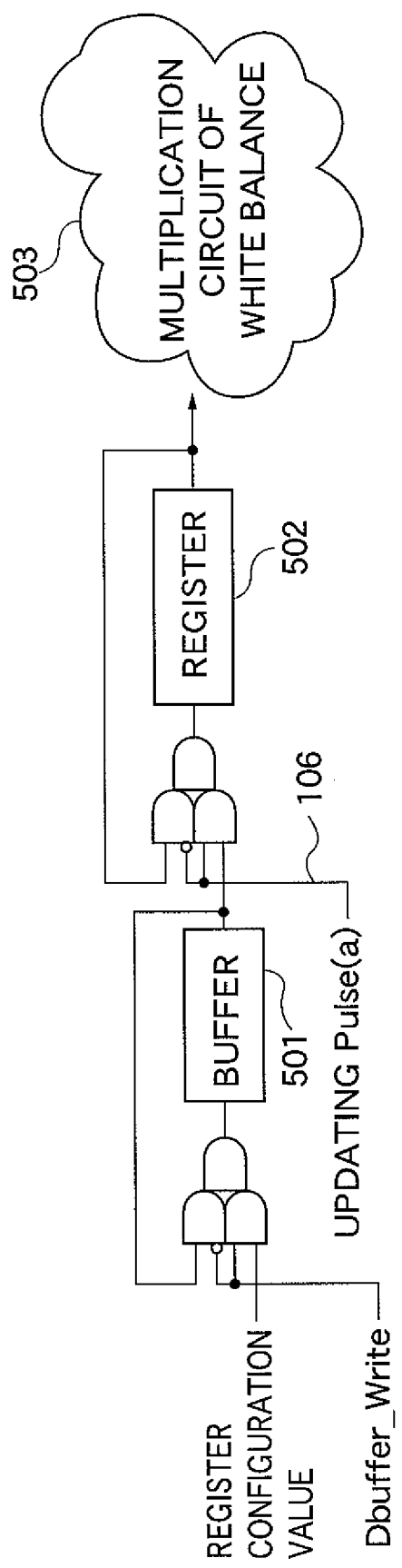
FIG. 22 is a schematic diagram of a white balance circuit.

The RGB signals output from the color interpolation circuit 406 are subjected to white balance correction by the white balance correction circuit 407. In white balance correction, a register value is updated on a frame-by-frame basis because a white balance correction value is required to be changed in accordance with a change in a light source in a photographing scene during photographing performed while viewing the photographing scene e.g. through an electronic viewfinder (hereinafter referred to as the EVF). For this reason, in the white balance correction circuit 407, resister configuration is performed using a double buffer configuration in which one buffer stage 501 is provided upstream of a register 502 as shown in FIG. 22. Now, timing for updating the register value of a coefficient of a multiplication circuit 503 of the white balance correction circuit 407 in FIG. 22 will be explained by way of example. At a time point $t_3$ in a photographing period in FIG. 21, a white balance correction value for the next frame is output as a register configuration value from the CPU 101, and a Dbuffer_Write signal is asserted, whereby writing in the buffer 501 is performed. Then, at a time point $t_4$ in a blanking period in FIG. 21, writing in the register 502 is performed from the buffer 501 in timing in which the updating pulse (a) 106 output from the updating pulse generating circuit 104 appearing in FIG. 1 is generated, whereby the register value is updated and the coefficient of the multiplication circuit 503 of the white balance correction circuit 407 is changed.

Figure 19:
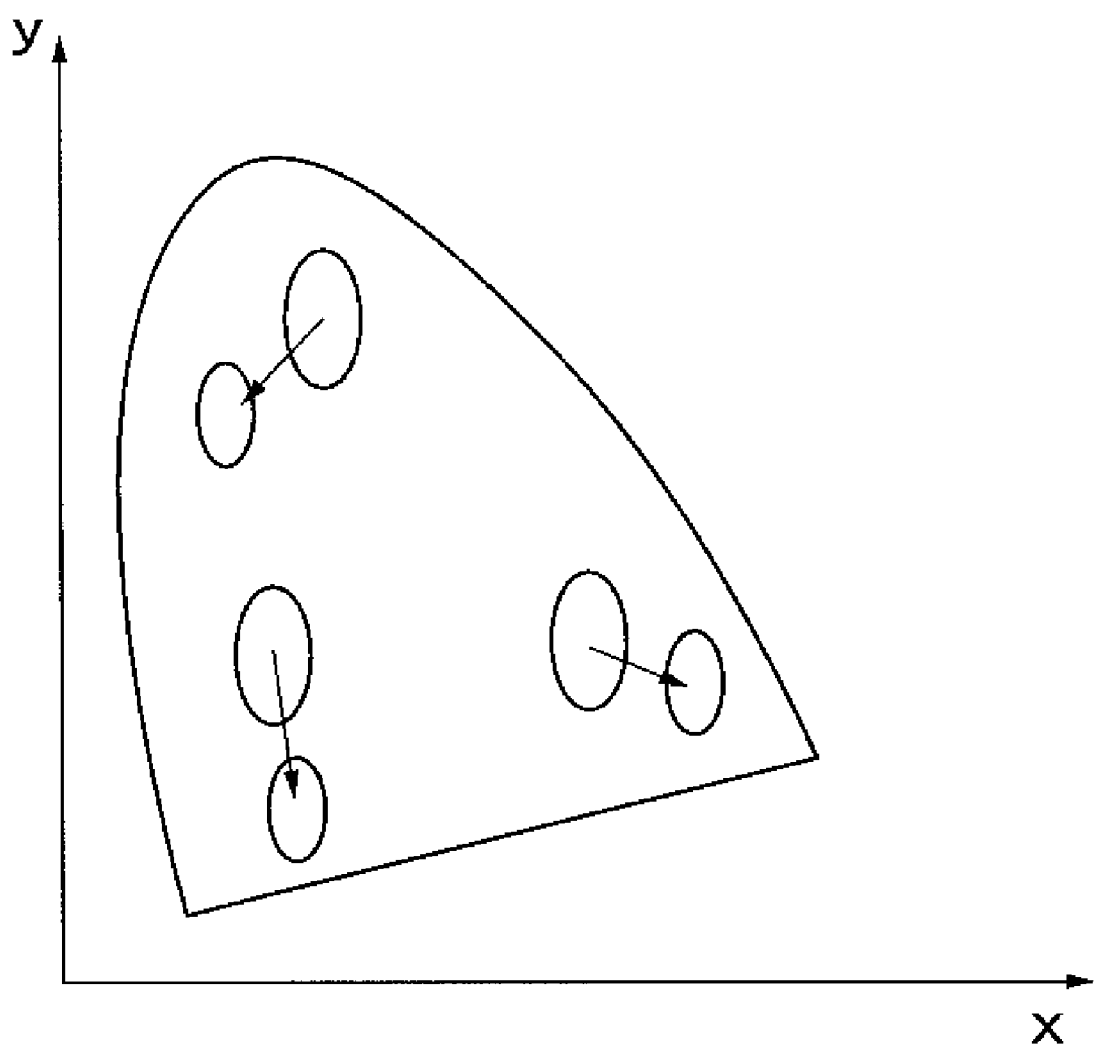
FIG. 19 is an xy chromaticity diagram in a xyz coordinate system according to CIE (Commission International de l'Echairage)

The RGB signal having undergone white balance correction by the white balance correction circuit 407 is subjected to color tone modification of an image by the 3D LUT conversion circuit 408 according to the 3D LUT configured by the user. The 3D LUT is configured by changing a color tone by bringing a color in one area to a color in another area as shown in FIG. 19. For example, in the case where an R pixel, a G pixel, and a B pixel are each formed of 8 bits, and input RGB data of 8 bits×3=24 bits is subjected to 3D LUT conversion to be output as RGB data of 8 bits×3=24 bits, the input RGB data has 16 M colors ($(2^8)^3$=16 M), and hence a RAM of 16 M×24 bits=48 M Bytes is needed for providing data to be output for 16 M colors. When color tone configuration is changed, data stored in the 48 M-Byte RAM are all set in registers. Therefore, register configuration or updating for the 3D LUT conversion circuit 408 is performed by the method, described in the first and second embodiments, in which register configuration values are stored in the FIFO 108 of the CPU IF 102 during a video photographing period. As shown in FIG. 21, when the user selects one color tone from several kinds of provided color tones at a time point $t_1$, the 3D LUT configuration values are stored from the CPU 101 into the FIFO 108 of the CPU IF 102 at a time point $t_2$ in the video photographing period, and then register updating for the 3D LUT conversion circuit 408 is performed from the FIFO 108 at the time point $t_4$ in the following blanking period at which the updating pulse (a) 106 output from the updating pulse generating circuit 104 appearing in FIG. 1 is generated.

Figure 20:
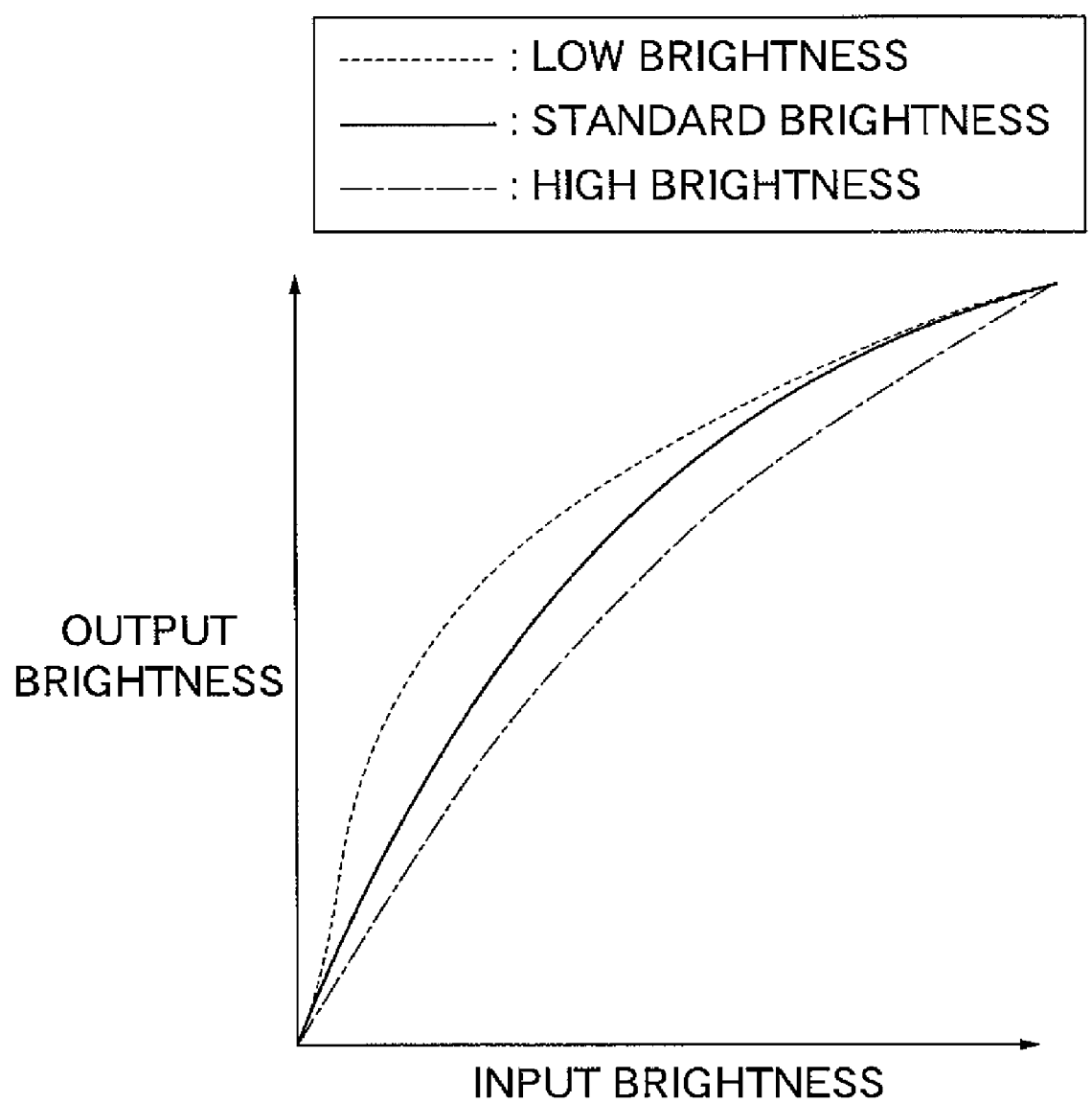
FIG. 20 is a diagram of a gamma table for image processing.

The RGB signals having undergone color tone correction by the 3D LUT conversion circuit 408 are subjected to gamma correction by the gamma table conversion circuit 409. This gamma correction is characterized, as shown in FIG. 20, in that when an LCD backlight is low in brightness, an output brightness is made higher than a standard brightness, whereas when the LCD backlight is high in brightness, the output brightness is made lower than the standard brightness. For example, if the R, G, B pixels are each formed of 8 bits, there are also 16 M values ($(2^8)^3$=16 M) each indicative of an input brightness in the gamma table conversion circuit 409, and a RAM of 16 M×24 bits=48 M Bytes is required for providing values each indicative of an output brightness corresponding to the input brightness. When gamma configuration is changed, data stored in the 48 M-Byte RAM are all set in registers of the gamma table conversion circuit 409. Therefore, register configuration for the gamma conversion circuit 409 is performed from the FIFO 108 of the CPU IF 102. When the configuration is performed by the user at the time point $t_1$ in FIG. 21, register configuration values are stored in the FIFO 108 of the CPU IF 102 at the time point $t_2$ in the video photographing period, and then register configuration for the gamma conversion circuit 409 is performed from the FIFO 108 at the time point $t_4$ in timing in which the updating pulse (a) 106 output from the updating pulse generating circuit 104 appearing in FIG. 1 is generated.

It should be noted that the tables in the 3D LUT conversion circuit 408 and the gamma conversion circuit 409 are changed according to user operation. Further, the 3D LUT conversion circuit 408 and the gamma conversion circuit 409 are not changed simultaneously. The RGB signal having undergone gamma correction by the gamma conversion circuit 409 is converted into YUV signals by the color space conversion circuit 410 and output therefor.

The YUV signals output from the color space conversion circuit 410 are processed by the zoom circuit 411 such that an image formed thereby has a size of 720×240 for the EVF, for example. Insofar as the register of the zoom circuit 411 is concerned, in the case where photographing is performed e.g. while viewing the EVF, when electronic zooming is performed by the user, the register storing a magnification/reduction ratio or the like, for use in gradually changing the size of an image displayed on the EVF, is required to be reset on a frame-by-frame basis. Therefore, in the register of the zoom circuit 411, register updating is performed using a double buffer appearing in FIG. 22. As shown in FIG. 21, a value is written in the buffer 501 at the time point $t_3$ in the video photographing period, and at the time point $t_4$ in the blanking period, the value of the register 502 is updated on a frame-by-frame basis in timing in which the updating pulse (a) 106 output from the updating pulse generating circuit 104 appearing in FIG. 1 is generated.

The YUV signals reduced or magnified in image size by the zoom circuit 411 is subjected to video modulation by the video modulator circuit 412 and then is displayed on the liquid crystal display 413.

Further, the YUV signal output from the zoom circuit 411 are temporarily stored in the DRAM 415 via the memory control circuit 414. The image signal temporarily stored in the DRAM 415 is read out via the memory control circuit 414, and compressed by the compression circuit 418, followed by being temporarily stored in the DRAM 415 again via the memory control circuit 414. The compressed image signal temporarily stored in the DRAM 415 is read out via the memory control circuit 414 to be written into the media card 417 by the media controller circuit 416.

Although in the above described first and second embodiments, the CPU IF circuit is formed by a logic circuit, this is not limitative, but the CPU IF circuit may be formed by a controller including a CPU, a ROM, and a RAM such that the functions of the CPU IF circuit can be realized by software executed by the controller.

Further, it is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

The above program has only to realize the functions of the above described embodiment on a computer, and the form of the program may be an object code, a program code executed by an interpreter, or script data supplied to an OS.

In this case, the program code itself read from the storage medium realizes the functions of any of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

This application claims the benefits of Japanese Patent Applications No. 2005-135350, filed May 6, 2005, and No. 2006-117655, filed Apr. 21, 2006, which are hereby incorporated by reference herein in their entirety.

What is claimed is:

1. A digital camera for performing register configuration for a register group including a control register for controlling at least one of an image display device and an image pickup apparatus, comprising:

a first selection section that receives register configuration value information comprising a register configuration value and address information, selects a transmission destination to which the register configuration value is to be sent, from a plurality of first transmission destinations based on the address information, and sends the register configuration value to the selected destination;

at least one temporary storage section that temporarily stores the register configuration value sent from said first selection section, and reads out and outputs the register configuration value in predetermined timing included in at least one of a non-display period during which an image scanning line is not positioned on an effective display screen of the image display device and a blanking period during which no effective video signal is output from an image pickup element of a image pickup apparatus, said temporary storage section being one of the first transmission destinations; and a second selection section that selects one of the register configuration value sent from said first selection section and the register configuration value output from said temporary storage section, according to a predetermined priority, and outputs the selected register configuration value, said second selection section being another of the first transmission destinations.

2. A digital camera as claimed in claim 1, wherein the register configuration control device, the register configuration control device further comprising:

a third selection section that selects a transmission destination to which the register configuration value output from said second selection section is to be sent, from at least one second transmission destination based on address information contained in the register configuration value output from said second selection section, and sends the register configuration value to the selected destination, and a writing section that writes a register configuration value contained in the register configuration value sent from said third selection section into a register included in the at least one second transmission destination and indicated by address information contained in the register configuration value sent from said third selection section.

3. A digital camera as claimed in claim 1, wherein said at least one temporary storage section includes first and second temporary storage devices, the register configuration control device further comprising:

a first notification section that notifies said first temporary storage device of first predetermined timing included in the blanking period, and a second notification section that notifies said second temporary storage device of second predetermined timing included in the non-display period.

4. A digital camera as claimed in claim 1, wherein timing in which register configuration value is sent from said first selection section to said second selection section is included in the non-display period in a case where register configuration is to be performed for the register group of the image display device, and is included in the blanking period during in a case where register configuration is to be performed for the register group of the image pickup apparatus, and wherein register configuration is performed whenever required in a case where the register configuration is to be performed for a register other than the image display device or the image pickup apparatus.

* * * * *